(12) United States Patent  
Fan et al.

(10) Patent No.: US 11,874,488 B1  
(45) Date of Patent: Jan. 16, 2024

(54) DIFFRACTIVE OPTICAL WAVEGUIDE AND DISPLAY APPARATUS HAVING SAME

(71) Applicant: JIAXING UPHOTON OPTOELECTRONICS TECHNOLOGY CO., LTD., Tongxiang (CN)

(72) Inventors: Zhentao Fan, Tongxiang (CN); Xingming Zhao, Tongxiang (CN); Kehan Tian, Tongxiang (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 18/350,658

(22) Filed: Jul. 11, 2023

(30) Foreign Application Priority Data

Aug. 3, 2022 (CN) .......................... 202210924670.7

(51) Int. Cl.  
*F21V 8/00* (2006.01)  
*G02B 27/42* (2006.01)  
*G02B 6/34* (2006.01)  
*G02B 27/01* (2006.01)

(52) U.S. Cl.  
CPC .............. *G02B 6/005* (2013.01); *G02B 6/34* (2013.01); *G02B 27/0172* (2013.01); *G02B 27/4205* (2013.01)

(58) Field of Classification Search  
CPC ........ G02B 6/005; G02B 6/0053; G02B 6/34; G02B 27/0172; G02B 27/4205  
See application file for complete search history.

(56) References Cited

U.S. PATENT DOCUMENTS 9,187,175 B1 * 11/2015 Chen .................... B64C 29/0008  
2008/0138024 A1 * 6/2008 Parker .................. G02B 6/0053  
385/130

FOREIGN PATENT DOCUMENTS

| CN | 109459813 A | 3/2019 |
| CN | 113325507 A | 8/2021 |
| WO | 2021169383 A1 | 9/2021 |
| WO | 2022050232 A1 | 3/2022 |
| WO | 2022115580 A1 | 6/2022 |

* cited by examiner

*Primary Examiner* — Michael P Mooney  
(74) *Attorney, Agent, or Firm* — HAUPTMAN HAM, LLP

(57) ABSTRACT

A diffractive optical waveguide and a display apparatus are disclosed. A coupling-out grating includes a first grating having a first, second, and third grating vectors, directions of the second and third grating vectors, being respectively towards both sides of a direction of first grating vector, form acute angles with it, a cross-section profile of an optical unit structure of the first grating has a first, second, third, and fourth vertices, a straight line passing through the first and second vertices and a straight line passing through the third and fourth vertices are perpendicular to the direction, a straight line passing through the first and fourth vertices and a straight line passing through the second and third vertices respectively form angles $\theta_1$ and $\theta_2$ having a same sign with the direction, wherein $15° \leq |\theta_1| \leq 45°$ and $15° \leq |\theta_2| \leq 45°$.

20 Claims, 9 Drawing Sheets

DIFFRACTIVE OPTICAL WAVEGUIDE AND DISPLAY APPARATUS HAVING SAME

FIELD OF THE INVENTION

The present disclosure relates to a display technology based on diffraction, in particular to a diffractive optical waveguide and a display apparatus having the diffractive optical waveguide.

BACKGROUND

Diffraction-based display technology has developed rapidly in recent years, and it can be applied to a display apparatus such as a near-eye display apparatus, a head-mounted display apparatus, and a head-up display apparatus. A diffractive optical waveguide is an important optical device that can be used in diffraction display technology. The diffractive optical waveguide that can be used for display is provided with a coupling-in grating and a coupling-out grating on a waveguide substrate; the coupling-in grating couples incident light carrying image information into the waveguide substrate; the coupling-out grating propagates and expands the light carrying image information, and at the same time couples the light out of the waveguide substrate to form a coupled-out light field. The eye receives the light of the coupled-out light field so that an image carried by the incident light can be observed.

The coupling-out grating of the diffractive optical waveguide can adopt a two-dimensional grating structure. In the two-dimensional grating structure, an optical unit structure usually adopts a circular, rectangular, or rhombus structure in cross-section. When light is coupled into such a coupling-out grating, there will be a bright line in the middle. At the same time, it will lead to the reduction of light splitting energy on both sides, which is adverse to expansion of light energy to both sides and influences the light uniformity of the waveguide.

In order to improve brightness and uniformity, a combination grating, with one-dimensional gratings respectively provided at both sides of the two-dimensional coupling-out grating, has been proposed. Such a coupling-out grating significantly improves the coupled-out efficiency of the field of view at both sides and thus to increase the brightness and suppress a bright line in the middle. However, the overall light uniformity is still not satisfactory.

The light coupled-out efficiency as well as the uniformity of an output light field of the diffraction waveguide still needs to be improved urgently.

SUMMARY

The object of the present disclosure is to provide a diffractive optical waveguide, a design method and a forming method thereof, and a display apparatus including the diffractive optical waveguide, so as to at least partly overcome the deficiencies in the prior art.

According to one aspect of the present disclosure, a diffractive optical waveguide is provided, including a waveguide substrate and a coupling-out grating formed on the waveguide substrate, wherein the coupling-out grating is configured to couple at least a portion of light within the waveguide substrate propagating thereinto through total internal reflection along a coupling-in direction out of the waveguide substrate by diffraction, the coupling-out grating includes a first grating, and the first grating includes a plurality of first optical unit structures arranged in an array along a plane and has a first grating vector, a second grating vector, and a third grating vector, wherein a direction of the first grating vector is a first direction, and the first direction is substantially consistent with the coupling-in direction, and directions of the second grating vector and the third grating vector, being respectively towards both sides of the first direction, form respective acute angles with the first direction, wherein:

the first optical unit structure has a first predetermined profile when viewed in the plane, and the first predetermined profile has a first vertex, a second vertex, a third vertex and a fourth vertex, arranged in sequence along the circumferential direction, wherein the first vertex and the second vertex are located at one end of the first predetermined profile in the first direction, a third vertex and a fourth vertex are located at the other end of the first predetermined profile in the first direction, and the first vertex and the third vertex are outermost vertices of the first predetermined profile in a second direction perpendicular to the first direction; and a first straight line extending through the first vertex and the second vertex and a second straight line extending through the third vertex and the fourth vertex are substantially perpendicular to the first direction, and a third straight line extending through the first vertex and the fourth vertex forms a first angle θ1 with the first direction, a fourth straight line extending through the second vertex and the third vertex forms a second angle $\theta_2$ with the first direction, where $15°\leq|\theta_1|\leq45°$, $15°\leq|\theta_2|\leq45°$, and the first angle $\theta_1$ and the second angle $\theta_2$ have a same positive or negative sign.

Advantageously, the third straight line and the fourth straight line are substantially perpendicular to the second grating vector or the third grating vector.

Advantageously, a part of the first predetermined profile between any two adjacent vertices adjacent to each other of the first vertex, the second vertex, the third vertex, and the fourth vertex deviates from a straight line extending through the two vertices by a distance less than or equal to one-fifth of a distance between the two vertices.

Advantageously, the third straight line and the fourth straight line are parallel to each other.

Advantageously, the first predetermined profile has an overall length L in the first direction and an average width W in the second direction, where $0.1 L \leq W \leq L$.

In some embodiments, the first predetermined profile is a quadrilateral.

In some embodiments, a profile line connecting at least one pair of adjacent vertices among the first vertex, the second vertex, the third vertex, and the fourth vertex along the circumferential direction, is a curve.

In some embodiments, a profile line connecting the first vertex and the second vertex and a profile line connecting the third and the fourth vertex are curves, and/or a profile line connecting the first vertex and the fourth vertex and a profile line connecting the second vertex and the third vertex are curves.

In some embodiments, the first predetermined profile further has a fifth vertex and a sixth vertex, the fifth vertex is located between the first vertex and the fourth vertex along the circumferential direction, and the sixth vertex is located between the second vertex and the third vertex along the circumferential direction.

In some embodiments, a distance from the fifth vertex to the first vertex is substantially equal to that from the fifth vertex to the fourth vertex, and a distance from the sixth vertex to the second vertex is substantially equal to that from the sixth vertex to the third vertex.

In some embodiments, a straight line extending through the first vertex and the fifth vertex and a straight line extending through the third vertex and the sixth vertex are parallel to each other, and a straight line extending through the fourth vertex and the fifth vertex and a straight line extending through the second vertex and the sixth vertex are parallel to each other, or the straight line extending through the first vertex and the fifth vertex and the straight line extending through the second vertex and the sixth vertex are parallel to each other, and the straight line extending through the fourth vertex and the fifth vertex and the straight line extending through the third vertex and the sixth vertex parallel to each other.

In some embodiments, a profile line, between at least one pair of adjacent vertices connected circumferentially among the first vertex, the second vertex, the third vertex, the fourth vertex, the fifth vertex, and the sixth vertex, is a curve.

In some embodiments, profile lines, between adjacent vertices connected circumferentially among the first vertex, the second vertex, the third vertex, the fourth vertex, the fifth vertex, and the sixth vertex, are curves.

Advantageously, the plurality of the first optical unit structures are arranged to form a plurality of rows extending along the second direction, and the plurality of rows are arranged with a predetermined pitch in the first direction, the first optical unit structures are arranged with a period P in the row, and the first optical unit structures in two adjacent rows among the plurality of rows are staggered by a predetermined distance s in the second direction, wherein, s=P/n and 1.33≤n≤4. Preferably, n=2.

In some embodiments, the coupling-out grating further includes a second grating, which includes a plurality of second optical unit structures arranged in an array along the plane, and has the first grating vector, the second grating vector, and the third grating vector;

the second optical unit structure has a second predetermined profile when viewed in the plane, and the second predetermined profile has a seventh vertex, an eighth vertex, a ninth vertex, and a tenth vertex arranged in sequence along the circumferential direction, wherein the seventh vertex and the eighth vertex are located at one end of the second predetermined profile in the first direction, the ninth vertex and the tenth vertex are located at the other end of the second predetermined profile in the first direction, the seventh vertex and the ninth vertex are outermost vertices of the second predetermined profile in the second direction;

a fifth straight line extending through the seventh vertex and the eighth vertex and a sixth straight line extending through the ninth vertex and the tenth vertex are substantially perpendicular to the first direction, and a seventh straight line extending through the seventh vertex and the tenth vertex forms a third angle $\theta_3$ with the first direction, an eighth straight line extending through the eighth vertex and the ninth vertex forms a fourth angle $\theta_4$ with the first direction, where $15°\leq|\theta_3|\leq45°$, $15°\leq|\theta_4|\leq45°$, and the third angle $\theta_3$ and the fourth angle $\theta_4$ have the same positive or negative sign; and the first grating and the second grating are arranged side by side in the second direction so that the third straight line and the fourth straight line in the first predetermined profile of the first grating tilt towards the second grating along the first direction and the seventh straight line and the eighth straight line in the second predetermined profile of the second grating tilt towards the first grating along the first direction.

In some embodiments, the coupling-out grating further includes a third grating, the third grating includes a plurality of third optical unit structures arranged in an array along the plane and has the first grating vector, the second grating vector, and the third grating vector; the third optical unit structure has a third predetermined profile symmetrical with respect to an axis along the first direction when viewed in the plane; and the third grating is arranged between the first grating and the second grating along the second direction.

In some embodiments, the coupling-out grating further includes a fourth grating and a fifth grating, arranged side by side with the first grating and the second grating in the second direction and respectively located outside the first grating and the second grating; and the fourth grating is a one-dimensional grating and has a fourth grating vector, the fifth grating is a one-dimensional grating and has a fifth grating vector, the fourth grating vector and the fifth grating vector are respectively the same as the second grating vector and the third grating vector, the fourth grating vector faces a direction away from the fifth grating, and the fifth grating vector faces a direction away from the fourth grating.

In some embodiments, the coupling-out grating further includes a third grating, the third grating including a plurality of third optical unit structures arranged in an array along the plane and has the first grating vector, the second grating vector, and the third grating vector; the third optical unit structure has a third predetermined profile symmetrical with respect to an axis along the first direction when viewed in the plane; and the first grating and the third grating are arranged side by side in the second direction so that the third straight line and the fourth straight line in the first predetermined profile of the first grating tilt towards the third grating along the first direction.

According to another aspect of the present disclosure, a display apparatus is further provided, which includes the above-mentioned diffractive optical waveguide.

Advantageously, the display apparatus is a near-eye display apparatus and includes a lens and a frame for holding the lens close to the eye, the lens including the diffractive optical waveguide.

Advantageously, the display apparatus is an augmented reality display apparatus or a virtual reality display apparatus.

In the diffractive optical waveguide according to an embodiment of the present disclosure, the coupling-out grating at least partially adopts the first grating and/or the second grating that are left-right asymmetric with respect to the first direction (basically the direction of the first grating vector consistent with the coupling-in direction), which can greatly improve light splitting ability to one-side region. At the same time, compared with the one-dimensional grating, the first grating and/or the second grating have the structural characteristics perpendicular to the first direction, which is equivalent to truncate the one-dimensional grating, so as to obtain a stronger modulation effect of the first grating vector, enabling enhanced light beam coupled-out capability in the one-sided region. These help to significantly improve the uniformity of the output light field of the diffractive optical waveguide, avoid loss of light energy, and improve the overall light coupled-out efficiency.

BRIEF DESCRIPTION OF THE DRAWINGS

Other features, objects, and advantages of the invention will become more apparent by reading the following detailed description of non-limitative embodiments with reference to the following drawings.

DETAILED DESCRIPTION

Figure 1:
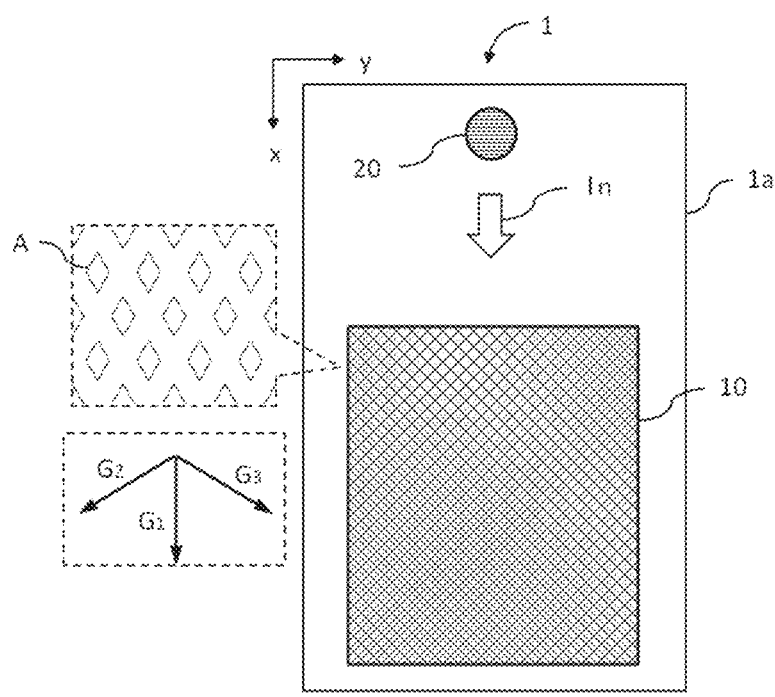
FIG. 1 schematically shows a diffractive optical waveguide in the prior art, wherein a coupling-out grating adopts a two-dimensional grating with rhombic optical unit structures.

The present disclosure will be further described in detail in conjunction with drawings and embodiments. It should be understood that the specific embodiments described herein are only used to explain the related disclosure, but not to limit the disclosure. For the convenience of description, only the parts related to the disclosure are shown in the drawings. It should be noted that the embodiments in the present application and the features of the embodiments may be combined with each other without conflict.

Figure 2:
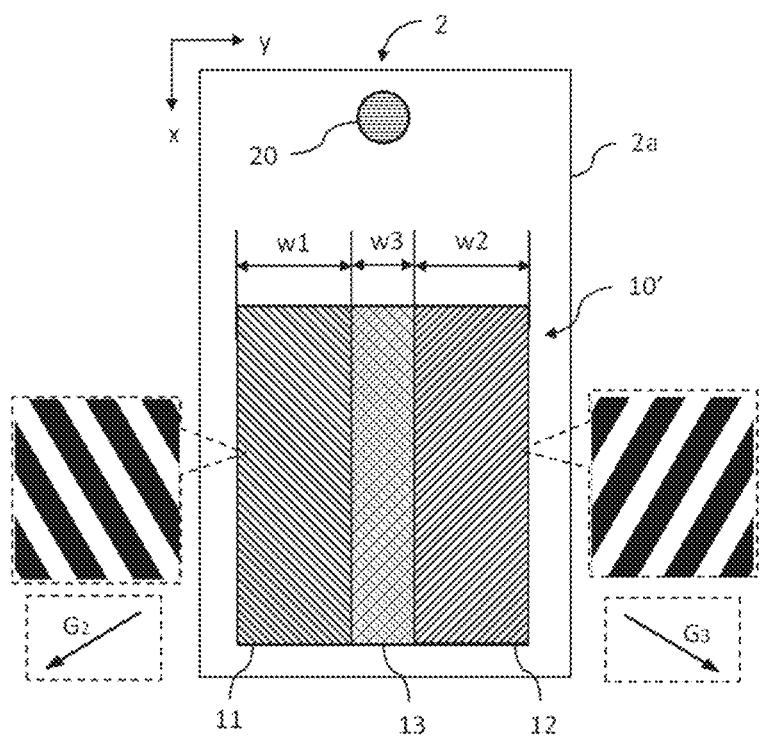
FIG. 2 schematically shows another diffractive optical waveguide in the prior art, where a coupling-out grating consists of one-dimensional gratings respectively provided at both sides and a two-dimensional grating sandwiched therebetween.

In order to facilitate the understanding of the present disclosure, first of all, two diffractive optical waveguides in the prior art are further introduced with reference to FIG. 1 and FIG. 2.

A diffractive optical waveguide 1 shown in FIG. 1 includes a waveguide substrate 1a, and a coupling-out grating 10 and a coupling-in grating 20 arranged on the waveguide substrate 1a. The coupling-out grating 10 is a two-dimensional grating, which has optical unit structures A(s), arranged in an array with a hexagonal (or an equilateral triangle) manner, as shown in a dotted line box on a left side of FIG. 1. In the example shown in FIG. 1, the optical unit structure has a rhombic cross-section in a plane parallel to the plane (x-y plane shown in Figure) of the waveguide substrate 100a. As further shown in FIG. 1, the two-dimensional coupling-out grating 10 has a first grating vector G1, a second grating vector G2, and a third grating vector G3, wherein the direction of the first grating vector G1 is the first direction (that is, x direction), which is also the coupling-in direction In of light propagating from the coupling-in grating 20 to the coupling-out grating 10. The directions of the second grating vector G2 and the third grating vector G3, respectively facing both sides of the first direction, form acute angles with the first direction. Usually, the acute angle is preferably 60°. The coupling-in grating 20 has the first grating vector G1. The light coupled into the waveguide substrate 1a through the coupling-in grating 20 can be coupled out from the waveguide substrate 1a under an action of negative first-order diffraction of the first grating vector G1 of the coupling-out grating 10, or can be coupled out from the waveguide substrate 1a under superposition of the negative first-order diffraction of the second grating vector G2 and the third grating vector G3 of the coupling-out grating 10.

A coupling-out grating 10' of a diffractive optical waveguide 2 shown in FIG. 2 is composed of one-dimensional gratings 11 and 12 respectively provided at both sides, and a two-dimensional grating 13 therebetween. For example, the two-dimensional grating 13 may adopt the same structure as that of the coupling-out grating 10 shown in FIG. 1, which will not be repeated here. The one-dimensional gratings 11 and 12 respectively provided at both sides, respectively have the same second grating vector G2 and third grating vector G3 as that of the two-dimensional grating 13, as shown in FIG. 2. A coupling-in grating 20 in the diffractive optical waveguide 2 is the same as that in the diffractive optical waveguide 1 shown in FIG. 1, and both have the first grating vector G1, which will not be repeated here.

Figure 3:
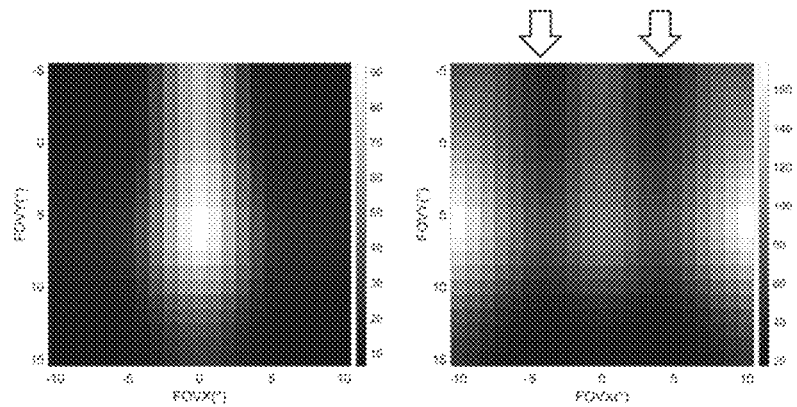
FIG. 3 shows examples of simulation diagrams of light intensity distribution of the output light fields of the diffractive optical waveguides shown in FIG. 1 and FIG. 2.

FIG. 3 shows examples of simulation diagrams of the light intensity distribution of the output light fields of the diffractive optical waveguide shown in FIG. 1 and FIG. 2. As shown in the left graph of FIG. 3, a bright line in the middle appears in the output light field of the diffractive optical waveguide 1, with low brightness on both sides and poor uniformity. As shown in the right graph of FIG. 3, compared with the diffractive optical waveguide 1, the diffractive optical waveguide 2 can suppress the bright line in the middle of the field of view, significantly increase the brightness of the fields of view at both sides, and improve the uniformity. However, the overall uniformity of the light intensity distribution of the diffractive optical waveguide 2 is still unsatisfactory, especially as indicated by the two arrows in FIG. 3, there are two obvious strip-shaped dark regions in a transition region between a middle of a field of view and an edge of the field of view.

Figure 4:
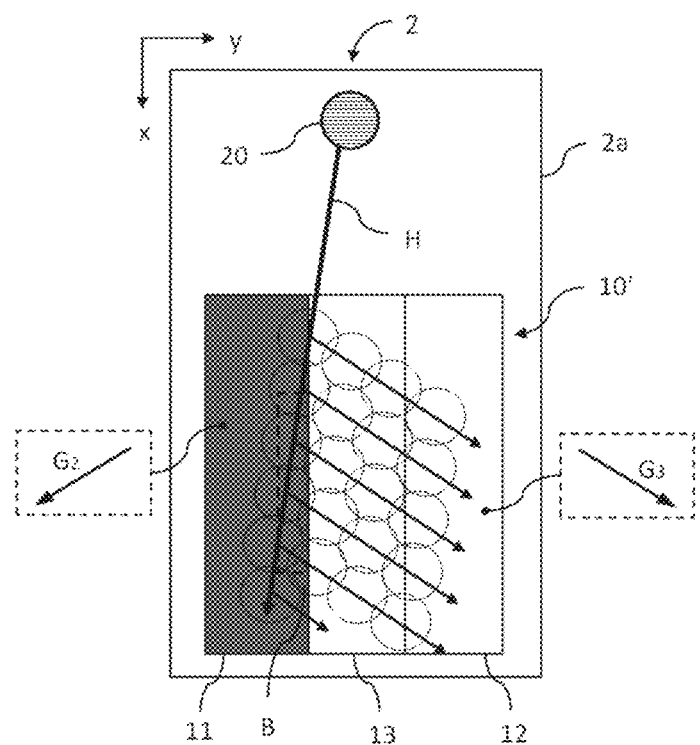
FIG. 4 illustrates a reason for formation of a strip-shaped dark region in the light intensity distribution of the diffractive optical waveguide shown in FIG. 2.

The present disclosure is made based on following observations and research on causes of forming strip-shaped dark regions in the light intensity distribution of the diffractive optical waveguide shown in FIG. 2. The light incident on the diffractive optical waveguide 2 is coupled into the waveguide substrate 2a through the positive first-order diffraction of the first grating vector G1 of the coupling-in grating 20, and propagates to the coupling-out grating 10' in the waveguide substrate by total internal reflection. FIG. 4 schematically shows that the field angle of view FOVX formed by a normal of the x-y plane where the diffractive optical waveguide 2 is located in the direction around the x-axis substantially corresponds to a light beam H at a central angle (see FIG. 3, about −5o) of one of the strip-shaped dark regions. As shown in FIG. 4, after the light beam H propagates to the one-dimensional grating 11 on the left side of the coupling-out grating 10', since the one-dimensional grating 11 only has the second grating vector G2, the light beam H cannot be coupled out of the waveguide substrate in the entire region of the one-dimensional grating 11. According to the field angle of view FOVX of the light beam H and a spatial position of a eyebox of the diffraction waveguide 2 relative to the coupling-out grating 10', the loss of the coupled-out light beam in the region indicated by the reference number "B" in FIG. 4 of the one-dimensional grating 11 results in (or spatially corresponds to) the strip-shaped dark region of the field angle of view FOVX at around −5o in the light intensity distribution of the diffractive optical waveguide 2 as shown in the graph on the right side of FIG. 3. The one-dimensional grating 12' is in the same or similar situation, resulting in the other strip-shaped dark region in the light intensity distribution.

Figure 5:
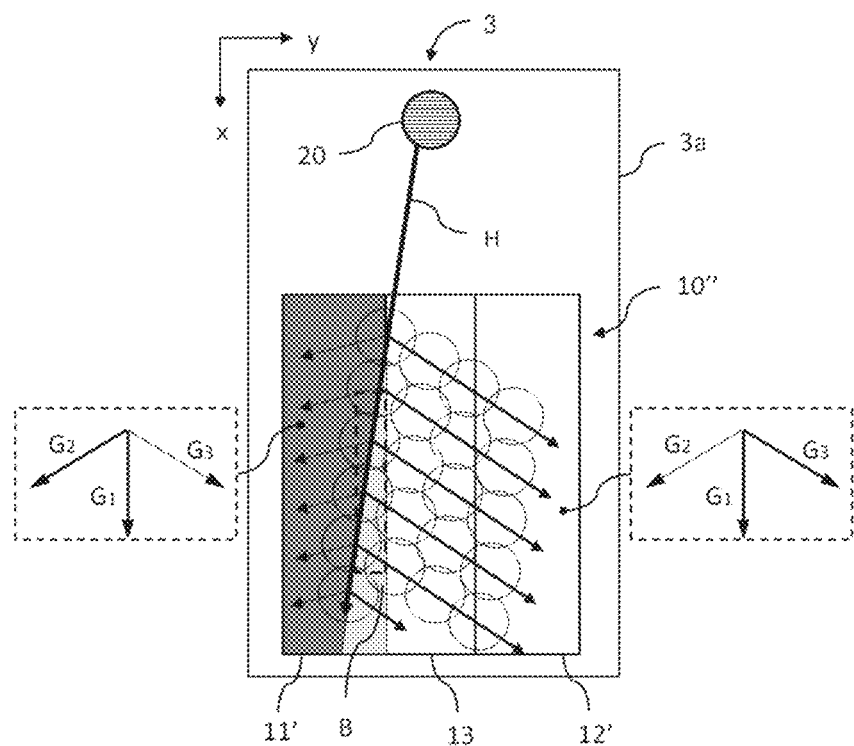
FIG. 5 illustrates a principle of improving the brightness of the strip-shaped dark region in the light intensity distribution of the diffractive optical waveguide shown in FIG. 2 in the diffractive optical waveguide according to an embodiment of the present disclosure.

Based on the above observations and research, the present disclosure proposes a new diffractive optical waveguide 3. As shown in FIG. 5, a coupling-out grating 10" of the diffractive optical waveguide 3 includes a first grating 11' and a second grating 12', and a third grating 13 therebetween, wherein the third grating 13 may have the same grating structure as the third grating 13 of the diffractive optical waveguide 2 shown in FIG. 2. The first grating 11' and the second grating 12' adopt two-dimensional gratings instead of one-dimensional gratings, and both have the same first grating vector G1, second grating vector G2, and third grating vector G3 as that of the third grating 13. According to the disclosure, the first grating 11' and the second grating 12' differ from the third grating 13 in that their grating structures enable that a modulation effect of the first grating vector G1 as well as the second grating vector G2 of the first grating 11' is very strong while the modulation effect of the third grating vector G3 is very weak, and a modulation effect of the first grating vector G1 as well as the third grating vector G3 of the second grating 12' is relatively strong, while a modulation effect of the second grating vector G2 is very weak.

FIG. 5 schematically illustrates a principle of brightness enhancement of the strip-shaped dark regions in the light intensity distribution of the diffractive optical waveguide shown in FIG. 2 in a diffractive optical waveguide 3. As shown in FIG. 5, the light incident on the diffractive optical waveguide 3 is coupled into a waveguide substrate 3a through the positive first-order diffraction of the first grating vector G1 of the coupling-in grating 20, and propagates to the coupling-out grating 10" in the waveguide substrate by total internal reflection. As shown in FIG. 5, after the same light beam (H) as shown in FIG. 4 propagates to the first grating 11' on the left side of the coupling-out grating 10", by traveling along a total reflection propagation path of the light beam H (that is, the path shown by a thick solid line in the Figure), the light beam H is gradually coupled out from the waveguide substrate 3a under the action of negative first-order diffraction of the first grating vector G1 of the first grating 11'. The modulation effect of the second grating vector G2 of the first grating 11' is significantly stronger than that of the third grating vector G3, which enables most of the light quantity in the light beam H to be split to the right side of the total reflection propagation path under the modulation effect of the second grating vector G2, and only a small amount to be split to the left side.

In other words, according to the present disclosure, by designing the first grating 11' as having the second grating vector G2 with a strong modulation effect and the third grating vector G3 with a weak modulation effect, it is beneficial to split light towards one side of the total reflection propagation path that contributes the light quantity in the eyebox (on the right side of the total reflection propagation path in the example shown in FIG. 5) and suppress the light splitting on the other side that makes no or little contribute to the light quantity in the eyebox, so as to avoid the light the loss of light quantity, and improve the overall light coupling-out efficiency. At the same time, by designing the first grating 11' as having the first grating vector G1 of which the modulation effect is as strong as possible, the efficiency of coupling the light out of the waveguide substrate can be effectively improved on the side where the amount of split light is large in the region of the first grating 11', including increasing the efficiency of coupling the light out of a region B, thus increasing the light quantity in the area of the field of view of diffractive optical waveguide 3, which corresponds to the corresponding strip-shaped dark region of the diffractive optical waveguide 2, and thus improving the uniformity of the output light field.

The second grating 12' in the coupling-out grating 10" of the diffractive optical waveguide 3 is in the same or similar situation as that of the first grating 11', so that it is beneficial to increase the light quantity in another strip-shaped dark region. It should be understood that in some implementations, the coupling-out grating 10" of the diffractive optical waveguide 3 may not include the second grating 12'.

Based on the above research, according to an embodiment of the present disclosure, a new diffractive optical waveguide is provided, wherein the modulation effect of the first grating vector G1 is enhanced by optimizing a cross-section profile of at least a part of the optical unit structures of the coupling-out grating, and the modulation effect of one of the second grating vector G2 and the third grating vector G3 is enhanced while suppressing that of the other one of them, so as to form an asymmetry with respect to the direction (first direction) of the first grating vector G1. Such a coupling-out grating is capable of forming an enhanced single-side light splitting and enhancing the coupling of the light out of this side, which is beneficial to improve the uniformity of the output light field of the diffractive optical waveguide, and at the same time reduces the loss of the light quantity/coupled-out efficiency within an eyebox range caused by the increasing of the light being coupled out.

Specifically, in the diffractive optical waveguide according to the embodiment of the present disclosure, the optimized cross-section profile (that is, the profile observed in the x-y plane) of at least a part of the optical unit structures of the coupling-out grating has a first vertex C1, a second vertex C2, a third vertex C3, and a fourth vertex C4. The first vertex C1 and the second vertex C2 are located at one end of the profile in an x direction, the third vertex C3 and the fourth vertex C4 are located at the other end of the profile in the x direction, and the first vertex C1 and the third vertex C3 are outermost vertices of the profile in the y direction. A first straight line l1 extending through the first vertex C1 and the second vertex C2 and a second straight line l2 extending through the third vertex C3 and the fourth vertex C4 are perpendicular to the x direction, and a third straight line l3 extending through the first vertex C1 and the fourth vertex C4 forms a first angle $\theta_1$ with the x direction, and a fourth straight line l4 extending through the second vertex C2 and the third vertex C3 forms a second angle $\theta_2$ with the x direction, where $15°≤|\theta_1|≤45°$, $15°≤|\theta_2|≤45°$, and the first included angle $\theta_1$ and the second included angle $\theta_2$ have a same positive or negative sign (see FIG. 8, and FIG. 10 to FIG. 13, which will be described in detail below). Here, "same positive or negative sign" means that the third straight line l3 and the fourth straight line l4 are inclined to a same side with respect to the x direction.

Next, diffractive optical waveguides according to various embodiments of the present disclosure will be described with reference to the drawings.

Figure 6:
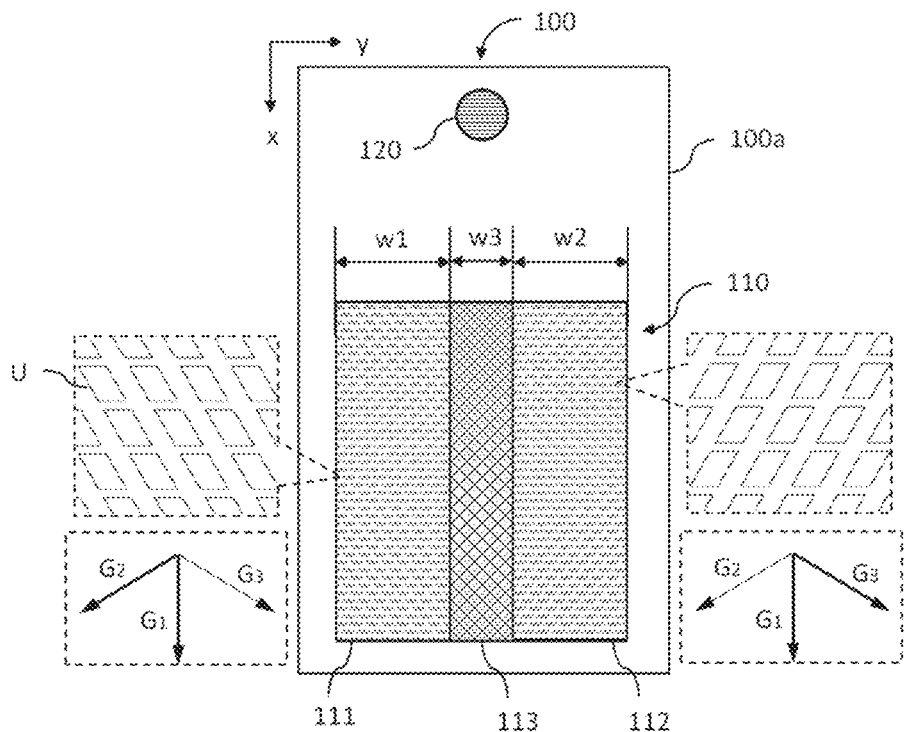
FIG. 6 is a schematic diagram of a diffractive optical waveguide according to Embodiment 1 of the present disclosure.

FIG. 6 is a schematic diagram of a diffractive optical waveguide 100 according to Embodiment 1 of the present disclosure. As shown in FIG. 6, the diffractive optical waveguide 100 includes a waveguide substrate 100a, and a coupling-out grating 110 and a coupling-in grating 120 formed on the waveguide substrate 100a. The coupling-out grating 110 is configured to couple at least a portion of light within the waveguide substrate 100a propagating thereinto through total internal reflection substantially along a coupling-in direction out of the waveguide substrate 100a by diffraction.

According to this embodiment, the coupling-out grating 110 includes a first grating 111, a second grating 112, and a third grating 113, the third grating 113 being located between the first grating 111 and the second grating 112 along the y direction perpendicular to the x direction, the first grating 111, the second grating 112, and the third grating 113 having the same first grating vector G1, second grating vector G2, and third grating vector G3. The direction of the first grating vector G1 is the first direction (that is, the x direction), which is also the coupling-in direction of the light propagating to the coupling-out grating 110. The directions of the second grating vector G2 and the third grating vector G3, being respectively towards both sides of the x direction, form respective acute angles with the first direction, usually, the acute angle is preferably 60°.

Each of the first grating 111, the second grating 112, and the third grating 113 includes a plurality of optical unit structures arranged in an array along the x-y plane. The third grating 113 may have a common grating structure for a two-dimensional coupling-out grating. For example, its optical unit structure can have a symmetrical profile relative to the x-axis when viewed in the x-y plane, such as a rhombus as shown in FIG. 1, or it can be, for example, a circle, rectangle or any other suitable shape. The first grating 111 and the second grating 112 include the optical unit structures having the optimized cross-section profiles described above according to the present disclosure. When viewed in the x-y plane, the optical unit structure of the second grating 112 and the optical unit structure of the first grating 111 may be symmetrical or approximately symmetrical to each other with respect to the x-axis. The first grating 111 will be described in detail below as an example.

Figure 7:
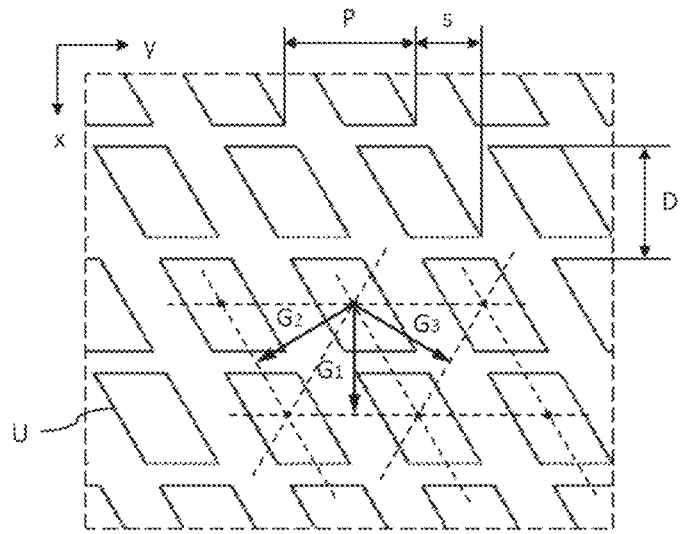
FIG. 7 is a partial enlarged view of a first grating of a coupling-out grating in the diffractive optical waveguide shown in FIG. 6.

FIG. 7 shows an enlarged view of the first grating 111 of the coupling-out grating 110 of the diffractive optical waveguide 100. As shown in FIG. 7, a plurality of optical unit structures U(s) of the first grating 111 are arranged to form a plurality of rows extending along the y direction, and the plurality of rows are arranged with a predetermined pitch D in the x direction, the optical unit structures U are arranged with a period P in each row, and the optical unit structures U in two adjacent rows among the plurality of rows are staggered by a predetermined distance s in the y direction, where s=P/n, n is an integer, and 1.33≤n≤4. Preferably, as shown in FIG. 7, n=2. More preferably, n=2 and the pitch D has a size, such that the directions of both the second and third grating vectors G2 and G3 are relative to the direction of the grating vector G1 (that is, the x direction) at an angle of 60o, and these grating vectors all have a same magnitude of vector.

Figure 8:
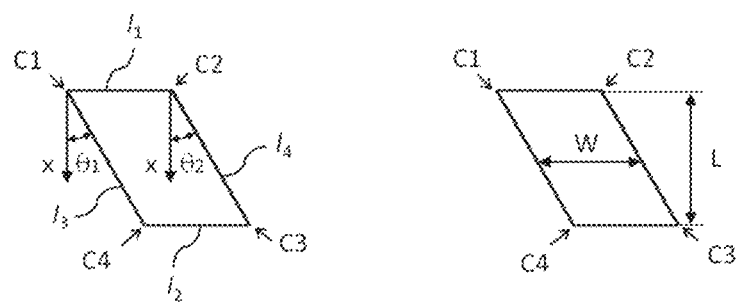
FIG. 8 is an enlarged view of a profile of an optical unit structure in the first grating shown in FIG. 7 when viewed in an x-y plane.

FIG. 8 is an enlarged view of the profile of the optical unit structure U of the first grating 111 viewed in the x-y plane. As shown in the graph on the left side in FIG. 8, the profile of the optical unit structure U of the first grating 111 is a parallelogram shape, wherein the profile lines connected between the respective vertices C1, C2, C3, and C4 are straight lines and opposite sides are parallel to each other, especially the profile line connected between the first vertex C1 and the second vertex C2 (coincident with the first straight line l1) and the profile line connected between the third vertex C3 and the fourth vertex C4 (coincident with the second straight line l2) are perpendicular to the x direction.

Preferably, in the example shown in FIG. 8, the profile line connected between the first vertex C1 and the fourth vertex C4 (coincident with the third straight line l3) and the profile line connected between the second vertex C2 and the third vertex C3 (coinciding with the fourth straight line l4) are substantially perpendicular to the direction of the second grating vector G2. In the situation that the second grating vector G2 is inclined at an angle of 60° to one side with respect to the x direction, the above profile line is inclined at an angle of 30° to the other side with respect to the x direction.

The second grating 112 includes the optical unit structure having an optimized cross-section profile described above according to the present disclosure. Although not shown in the figure, it can be understood that according to the embodiment of the present disclosure, when viewed in the x-y plane, the profile of the optical unit structure of the second grating 112 has a seventh vertex, an eighth vertex, a ninth vertex, and a tenth vertex arranged in sequence along the circumferential direction, wherein the seventh vertex and the eighth vertex are located at one end of the profile in the x direction, the ninth vertex and the tenth vertex are located at the other end of the profile in the x direction, and the seventh vertex and the ninth vertex are outermost vertices of the profile in the y direction. A fifth straight line extending through the seventh vertex and the eighth vertex and a sixth straight line extending through the ninth vertex and the tenth vertex are substantially perpendicular to the x direction, and a seventh straight line extending through the seventh vertex and the tenth vertex forms a third angle $\theta_3$ with the x direction, an eighth straight line extending through the eighth vertex and the ninth vertex forms a fourth angle $\theta_4$ with the x direction, where $15°≤|\theta_3|≤45°$, $15°≤|\theta_4|≤45°$, and the third angle $\theta_3$ and the fourth angle $\theta_4$ have the same positive or negative sign.

As introduced above, the optical unit structure of the second grating 112 and the optical unit structure of the first grating 111 may be symmetrical or approximately symmetrical to each other with respect to the x-axis. Specifically, the first grating 111 and the second grating 112 are arranged side by side along the y direction, so that the third straight line and the fourth straight line in the profile of the optical unit structure of the first grating 111 in the x-y plane tilt towards the second grating 112 along the x direction (or in other words along the coupling-in direction), and the seventh straight line and the eighth straight line of the profile of the optical unit structure of the second grating 112 in the x-y plane tilt towards the first grating 111 along the x direction (or in other words along the coupling-in direction).

The graph on the right side of FIG. 8 indicates an overall length L of the optical structural unit U of the first grating 111 in the x direction and an average width W in the y direction. Preferably, the relationship of the overall length L and the average width W satisfies $0.1\,L \leq W \leq L$.

Referring back to FIG. 6, the coupling-in grating 120 has a first grating vector G1. The light coupled into the waveguide substrate 100a through the coupling-in grating 120 can be coupled out from the waveguide substrate 1a under the action of the negative first-order diffraction of the first grating vector G1 of the coupling-out grating 110, or can be coupled out from the waveguide substrate 100a under the superposition of the positive first-order diffraction of the second grating vector G2 and the third grating vector G3 of the coupling-out grating 110. In some cases, the coupling-in grating 120 may be formed on another waveguide substrate other than the waveguide substrate 100a, and the light modulated by the coupling-in grating 120 and coupled into the another waveguide substrate may be transmitted into the waveguide substrate 100a. In this case, the diffractive optical waveguide 100 according to the embodiment of the present disclosure may not include the coupling-in grating 120.

In addition, in the diffractive optical waveguide 100 shown in FIG. 6, the coupling-out grating 110 includes a third grating arranged between the first grating 111 and the second grating 112, and the cross-section of the optical unit structure in the third grating 113 in the x-y plane has a symmetrical profile with respect to the x-axis. However, the present disclosure is not limited to the situation where such a third grating is included in the coupling-out grating, and in other embodiments of the present disclosure, the coupling-out grating may not include the third grating.

Figure 9:
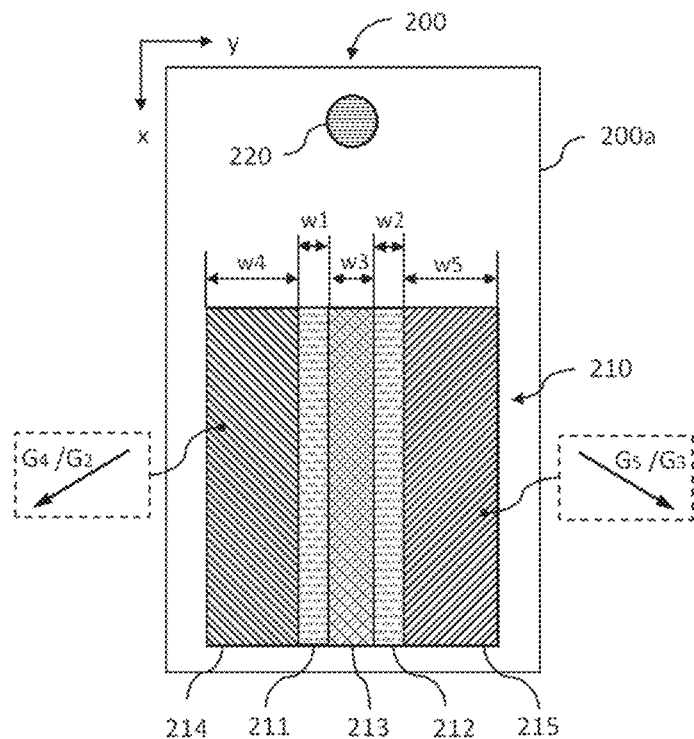
FIG. 9 is a schematic diagram of a diffractive optical waveguide according to Embodiment 2 of the present disclosure.

FIG. 9 is a schematic diagram of a diffractive optical waveguide 200 according to Embodiment 2 of the present disclosure. The diffractive optical waveguide 200 includes a waveguide substrate 200a, and a coupling-out grating 210 and a coupling-in grating 220 formed on the waveguide substrate 200a. As shown in FIG. 9, the coupling-out grating 210 includes a first grating 211, a second grating 212, a third grating 213, a fourth grating 214, and a fifth grating 215 arranged side by side along the y direction, wherein the third grating 213 is arranged between the first grating 211 and the second grating 212, the fourth grating 214 and the fifth grating 215 are respectively arranged outside the first grating 211 and the second grating. The first grating 211, the second grating 212, and the third grating 213 respectively have the same grating structures as that of the first grating 111, the second grating 112, and the third grating 113 in the coupling-out grating 110 of the diffractive optical waveguide 100 shown in FIG. 6, it won't be repeated here. As shown in FIG. 9, according to this embodiment, the fourth grating 214 is a one-dimensional grating and has a fourth grating vector G4, the fifth grating 215 is a one-dimensional grating and has a fifth grating vector G5, the fourth grating vector G4 and the fourth grating vector G5 are respectively the same as the second grating vector G2 and the third grating vector G3, the fourth grating vector G4 faces a direction away from the fifth grating, and the fifth grating vector G5 faces a direction away from the fourth grating.

In order to illustrate the technical advantages of the diffractive optical waveguides 100 and 200 according to the embodiments of the present disclosure in terms of light coupled-out efficiency and uniformity compared with the existing diffractive optical waveguides, Data example 1 of simulation calculation will be given below for diffractive optical waveguides with different structures.

In the various data examples given below, a wavelength of light is 532 nm, a refractive index of material of the waveguide substrate as well as the grating structure is 1.82, a distance between the coupling-in grating and the coupling-out grating along the x direction is 20 mm, dimensions of the coupling-out grating in the x direction and y direction are 24 mm and 28 mm respectively. The optical unit structure is formed as a concave hole structure with a depth of 57 nm, and in the array of the optical unit structure (including the first grating, the second grating, and the third grating) of the two-dimensional grating in the coupling-out grating as described above, the pitch D is equal to 420 nm, the period P is equal to 485 nm, and a staggered distance s is equal to P/2, so that the second grating vector G2 and the third grating vector G3 form an angle of 60° with respect to the x direction, and the first grating vector G1, the second grating vector G2 and the third grating vector G3 have the same magnitude.

Data Example 1

In Data Example 1, the diffractive optical waveguide 1 shown in FIG. 1, the diffractive optical waveguide 2 shown in FIG. 2, the diffractive optical waveguide 100 shown in FIG. 6 and the diffractive optical waveguide 200 shown in FIG. 9 are simulated respectively, and parameters thereof are set as follows.

For diffractive optical waveguide 1, the coupling-out grating 10 includes optical unit structures with rhombic cross-section profiles arranged in an array as described above, wherein a side length of the rhombic cross-section is 220 nm, and the upper and lower vertex angles are both 60°.

For the diffractive optical waveguide 2, in the coupling-out grating 10', in the y direction, the width w1 of the first grating 11 and the width w2 of the second grating 12 are both 9.5 mm, and the width w3 of the third grating 13 is 5 mm, and the optical unit structure of the third grating 13 has a rhombic cross-section profile, the side length of the rhombic cross-section is 220 nm, and the upper and lower vertex angles are 60°. The first grating 11 and the second grating 12 on both sides are one-dimensional wire gratings, respectively having the second grating vector G2 and the third grating vector G3, and a ridge width (the width of the convex structure) of the wire grating is 190.5 nm.

For the diffractive optical waveguide 100 (θ1=θ2=30°), in the coupling-out grating 110, in the y direction, the width w1 of the first grating 111 and the width w2 of the second grating 112 are both 9.5 mm, and the width w3 of the third grating 113 is 5 mm; the optical unit structure of the third grating 113 has a rhombic cross-section profile, the side length of the rhombic cross-section is 220 nm, and the upper and lower vertex angles are 60°. The optical unit structures of the first grating 111 all have parallelogram cross-section profiles as shown in FIG. 8, wherein a connecting line of the first vertex C1 and the second vertex C2 and a connecting line of the third vertex C3 and the fourth vertex C4 are perpendicular to the x direction and have lengths of 265 nm, a connecting line of the first vertex C1 and the fourth vertex C4 and a connecting line of the second vertex C2 and the third vertex C3 form angles of 30° (that is, θ12=30°) with the x direction and are perpendicular to the second grating vector G2, and the length of the optical unit structure of the first grating 111 along the x direction is 340 nm. The optical unit structure of the second grating 112 and the optical unit structure of the first grating 111 are symmetrical to each other with respect to the x axis.

For the diffractive optical waveguide 200 ($\theta_1=\theta_2=30°$), in the coupling-out grating 210, in the y direction, the width w1 of the first grating 211 and the width w2 the second grating 212 are both 2.5 mm, and the width w3 of the third grating 213 is 4 mm, and the width w4 of the fourth grating 214 and the width w5 the fifth grating 215 are both 7.5 mm. The optical unit structures of the first grating 211, the second grating 212, and the third grating 213 are respectively the same as that of the first grating 111, the second grating 112, and the third grating 113 in the diffractive optical waveguide 100 in Data Example 1. The fourth grating 214 and the fifth grating 215 are one-dimensional wire grating and respectively have the same structure parameters as that of the first grating 11 and the second grating 12 in the diffractive optical waveguide 2 in Data Example 1.

For the diffractive optical waveguide 200 ($\theta_1=\theta_2=15°$), except that $\theta1=\theta2=15°$, other parameters are the same as those in diffractive optical waveguide 200 ($\theta_1=\theta_2=30°$).

For the diffractive optical waveguide 200 ($\theta_1=\theta_2=45°$), except that $\theta_1=\theta_2=45°$, other parameters are the same as those in diffractive optical waveguide 200 ($\theta_1=\theta_2=30°$).

Based on the above-mentioned grating structure of the diffraction waveguide and same conditions of coupling light into the diffractive optical waveguide, the coupled-out efficiency and nonuniformity indices of different diffractive optical waveguides at the central position of the eyebox obtained by simulation calculation, as shown in Table 1.

TABLE 1

|  | Average efficiency of field of view on both sides | Average efficiency of field of view in the middle | Non-uniformity |
| --- | --- | --- | --- |
| Diffractive optical waveguide 1 | 1.45e−4 | 4.03e−4 | 14.75 |
| Diffractive optical waveguide 2 | 8.70e−4 | 5.08e−4 | 10.09 |
| Diffractive optical waveguide 100 ($\theta_1 = \theta_2 = 30°$) | 5.77e−4 | 5.00e−4 | 6.44 |
| Diffractive optical waveguide 200 ($\theta_1 = \theta_2 = 30°$) | 7.40e−4 | 5.66e−4 | 6.67 |
| Diffractive optical waveguide 200 ($\theta_1 = \theta_2 = 15°$) | 4.60e−4 | 5.25e−4 | 6.43 |
| Diffractive optical waveguide 200 ($\theta_1 = \theta_2 = 5°$) | 5.15e−4 | 5.05e−4 | 6.50 |

In this data example and following data examples, "field of view on both sides" refers to the field of view with a field angle of view FOVX ranging from −10° to −6° and from 6° to 10° relative to the normal of the x-y plane in the direction around the x-axis, and "the field of view in the middle" refers to the field of view with the field angle of view FOVX ranging from −5° to 5°. The above-mentioned average efficiency is a ratio of an average value of the light intensity of the coupled-out light field at each field angle of view to the light intensity of the coupling-in light of the grating structure, and the larger the value of the average efficiency, the higher the coupling-out efficiency. Overhigh the coupled-out efficiency in the middle would result in a middle bright line shown in the display image of the waveguide.

In this data example and the following data examples, "nonuniformity" is a ratio of the maximum value of light intensity to the minimum value of light intensity in the entire field of view, and the smaller the value of nonuniformity, the better the uniformity.

It can be seen from Table 1 that, compared with diffractive optical waveguides 1 and 2, the diffractive optical waveguides 100 and 200 according to the embodiments of the present disclosure significantly reduce the nonuniformity of the output light field and achieve a great improvement in uniformity.

At the same time, the diffractive optical waveguide 200 ($\theta_1=\theta_2=30°$) has good uniformity similar to that of the diffractive optical waveguide 100 ($\theta_1=\theta_2=30°$), and at the same time has higher coupled-out efficiency compared with the diffractive optical waveguide 100 ($\theta_1=\theta_2=30°$) at both sides of the field of view.

Although compared to the diffractive optical waveguide 200 ($\theta_1=\theta_2=30°$), the average efficiency of the field of view on both sides of the diffractive optical waveguide 200 ($\theta_1=\theta_2=15°$) as well as that of the diffractive optical waveguide 200 ($\theta_1=\theta_2=45°$) is decreased, the uniformities of them are similar to that of the diffractive optical waveguide 100 ($\theta_1=\theta_2=30°$) and the diffractive optical waveguide 200 ($\theta_1=\theta_2=30°$), which means that when $\theta_1$ and $\theta_2$ range from 15° to 45°, the diffractive optical waveguide according to the embodiment of the present disclosure can still help to improve the uniformity.

In addition, although the average efficiency of the field of view on both sides of the diffractive optical waveguide 200 ($\theta_1=\theta_2=15°$) as well as that the diffractive optical waveguide 200 ($\theta_1=\theta_2=45°$) has declined, it is still equivalent to the average efficiency of the field of view itself in the middle, which means that they are beneficial to a balance of light energy between the field of view on both sides and the field of view in the middle, and can be used to improve the overall uniformity of the light energy of the field of view on both sides and in the middle by losing part of the efficiency.

The diffractive optical waveguide according to the embodiment of the present disclosure has been described above in conjunction with the optical unit structure having a parallelogram cross-section profile as shown in FIG. 8. It should be understood that the cross-section profile of the optical unit structure of the diffractive optical waveguide according to the embodiment of the present disclosure is not limited to a parallelogram. For ease of understanding, the following will be introduced in combination with different examples of the cross-section profiles of the optical unit structures shown in FIGS. 10 to 13 and in conjunction with Data Example 2.

Figure 10:
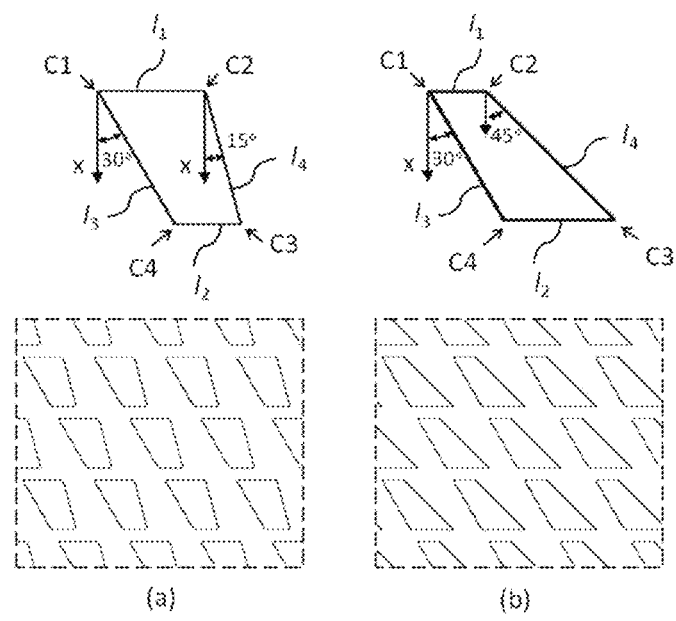
FIG. 10, FIG. 11, FIG. 12, and FIG. 13 show different examples of optical unit structures that can be used in diffractive optical waveguides according to embodiments of the present disclosure.
Figure 11:
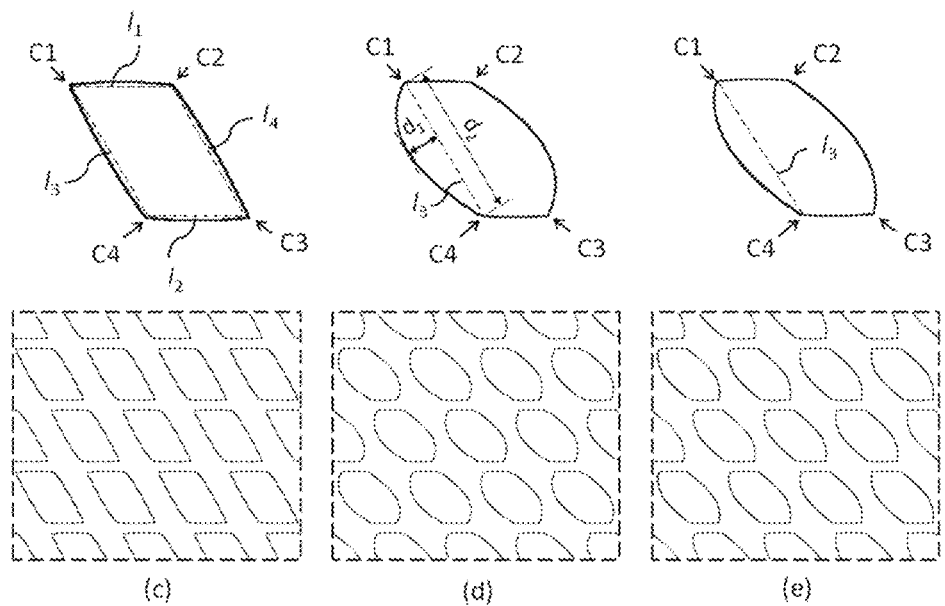
Figure 12:
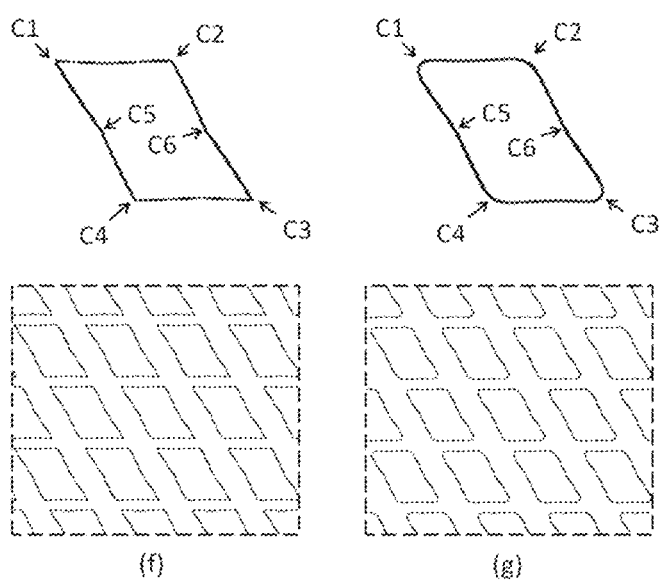
Figure 13:
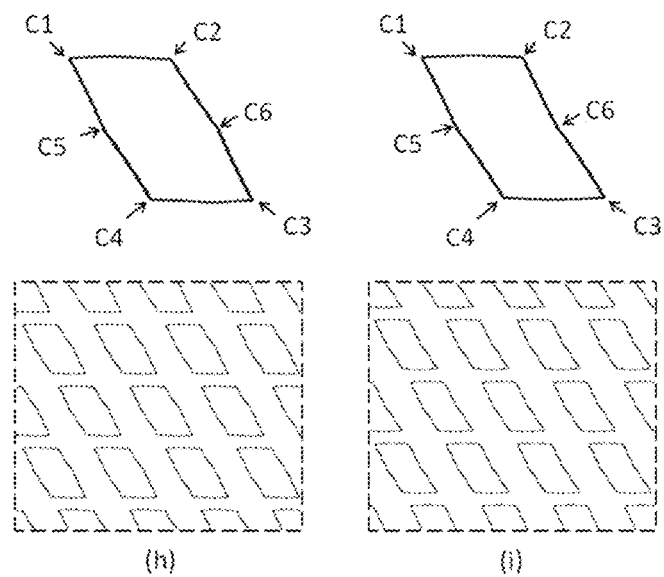

FIG. 10 shows an example of a cross-section profile of the optical unit structure, which is a quadrilateral where the third straight line $l_3$ and the fourth straight line $l_4$ are not parallel to each other. FIG. 11 shows an example where the profile lines between adjacent vertices are curves. FIG. 12 and FIG. 13 show different examples in which the profiles of the optical unit structures further include fifth vertices and sixth vertices, wherein FIG. 12 shows an example in which the fifth vertex and the sixth vertex are, respectively, deviated inwardly with respect to the third straight line $l_3$ and the fourth straight line $l_4$. FIG. 13 shows an example where the fifth vertex and the sixth vertex are, respectively, deviated outward with respect to the third straight line $l_3$ and the fourth straight line $l_4$, and an example where the fifth vertex and the sixth vertex are respectively, deviated in the same direction with respect to the third straight line $l_3$ and the fourth straight line $l_4$.

Data Example 2

In Data Example 2, the first grating 211 in the diffractive optical waveguide 200 shown in FIG. 9 is simulated and calculated by using the cross-section profiles of the optical unit structures shown in FIG. 10 to FIG. 13 and the examples (a) to (i) of the corresponding optical structures, and the parameters thereof are set as follows.

Example (a)

The optical unit structure has a trapezoidal cross-section profile, wherein a connecting line of the first vertex C1 and the second vertex C2 and a connecting line of the third vertex C3 and the fourth vertex C4 are perpendicular to the x direction and have lengths of 273 nm and 168 nm respectively; $\theta_1=30°$ and $\theta_2=15°$; and the overall length of the optical unit structure along the x direction is 340 nm.

Example (b)

The optical unit structure has a trapezoidal cross-section profile, wherein a connecting line of the first vertex C1 and the second vertex C2 and a connecting line of the third vertex C3 and the fourth vertex C4 are perpendicular to the x direction and have lengths of 149 nm and 268 nm respectively; 01=30° and 02=45°; and the overall length of the optical unit structure along the x direction is 340 nm.

Example (c)

In the cross-section profile of the optical unit structure, the first straight line $l_1$ is parallel to the second straight line $l_2$, and the third straight line $l_3$ is parallel to the fourth straight line $l_4$; $_{01=2=30}°$; and the profile line C12 between the first vertex C1 and the second vertex C2, the profile line C23 between the second vertex C2 and the third vertex C3, the profile line C34 between the third vertex C3 and the fourth vertex C4, and the profile line C41 between the fourth vertex C4 and the first vertex C1 are curves, and expressions thereof are as follows.

$C12: x = 000455y^2 + 0.0891y - 173.55;$ $C23: x = 0.001976y^2 + 1.2130y - 213.53$ $C34: x = -0.000455y^2 + 0.0891y + 173.55;$ $C41: x = -0.001976y^2 + 1.2130y + 213.53;$ wherein, the ratio of the maximum distance d1 of the profile line C41 deviating from the third straight line $l_3$ to the distance d2 between the fourth vertex C4 and the first vertex C1 is 1:30; and the ratio of the maximum distance of the profile line C23 deviating from the fourth straight line $l_4$ to the distance between the second vertex C2 and the third vertex C3 is 1:30.

Example (d)

In the cross-section profile of the optical unit structure, the first straight line $l_1$ is parallel to the second straight line $l_2$, and the third straight line $l_3$ is parallel to the fourth straight line $l_4$; $\theta_1=\theta_2=30°$; and the profile line C12, the profile line C23, the profile line C34 and the profile line C41 are curves, and expressions are as follows.

$C12: x = 000455y^2 + 0.0891y - 173.55$ $C23: y = -0.003114x^2 + 0.57647x + 182.00$ $C34: x = -0.000455y^2 + 0.0891y + 173.55$ $C41: y = 0.003114x^2 + 0.57647x - 182.00;$ wherein, the ratio of the maximum distance of the profile line C41 deviating from the third straight line $l_3$ to the distance between the fourth vertex C4 and the first vertex C1 is 1:4.7; and the ratio of the maximum distance of the profile line C23 deviating from the fourth straight line $l_4$ to the distance between the second vertex C2 and the third vertex C3 is 1:4.7.

Example (e)

In the cross-section profile of the optical unit structure, the first straight line $l_1$ is parallel to the second straight line $l_2$, and the third straight line $l_3$ is parallel to the fourth straight line $l_4$; $_{01=02=30\ 0}$; and the profile line C12, the profile line C23, the profile line C34 and the profile line C41 are curves, and expressions are as follows $C12: x = 0.000455y^2 + 0.0891y - 173.55;$ $C23: y = -0.002526x^2 + 0.62914x + 171.00;$ $C34: x = -0.000455y^2 + 0.0891y + 173.55;$ $C41: y = 0.002526x^2 + 0.62914x - 171.00;$ wherein, the ratio of the maximum distance of the profile line C41 deviating from the third straight line $l_3$ to the distance between the fourth vertex C4 and the first vertex C1 is 1:7; and the ratio of the maximum distance of the profile line C23 deviating from the fourth straight line $l_4$ to the distance between the second vertex C2 and the third vertex C3 is 1:7.

Example (f)

In the cross-section profile of the optical unit structure, the first straight line $l_1$ is parallel to the second straight line $l_2$, and the third straight line $l_3$ is parallel to the fourth straight line $l_4$; $\theta_1=\theta_2=30°$; and the fifth vertex C5 is located between the first vertex C1 and the fourth vertex C4 along the circumferential direction and a distance from the fifth vertex C5 to the first vertex C1 is the same as that from the fifth vertex C5 to the fourth vertex C4; the sixth vertex C6 is located between the second vertex C2 and the third vertex C3 along the circumferential direction and a distance from the sixth vertex C6 to the second vertex C2 is the same as that from the sixth vertex C6 to the third vertex C3; and examples of (x,y) coordinates of the first vertex C1, the second vertex C2, the third vertex C3, the fourth vertex C4, the fifth vertex C5 and the sixth vertex C6 are shown in Table 2.

TABLE 2

| Vertex | C1 | C2 | C3 | C4 | C5 | C6 |
|---|---|---|---|---|---|---|
| Coordinate (nm) | (−176,−249) | (−176,47) | (176,249) | (176,−47) | (0,−132) | (0,132) | wherein, the profile lines between adjacent vertices are straight lines.

Example (g)

The cross-section profile of the optical unit structure is the profile formed by chamfering the six vertices of the cross-section profile in example (f) with a radius R=25 nm.

Example (h)

In the cross-section profile of the optical unit structure, the first straight line $l_1$ is parallel to the second straight line $l_2$, and the third straight line $l_3$ is parallel to the fourth straight line $l_4$; $\theta_1=\theta_2=30°$; the fifth vertex C5 is located between the first vertex C1 and the fourth vertex C4 along the circumferential direction and a distance from the fifth vertex C5 to the first vertex C1 is the same as that from the fifth vertex C5 to the fourth vertex C4, and the sixth vertex C6 is located between the second vertex C2 and the third vertex C3 along the circumferential direction and a distance from the sixth vertex C6 to the second vertex C2 is the same as that from the sixth vertex C6 to the third vertex C3; and examples of (x,y) coordinates of the first vertex C1, the second vertex C2, the third vertex C3, the fourth vertex C4, the fifth vertex C5 and the sixth vertex C6 are shown in Table 3.

TABLE 3

| Vertex | C1 | C2 | C3 | C4 | C5 | C6 |
|---|---|---|---|---|---|---|
| Coordinate (nm) | (−164,−212) | (−164,22) | (164,212) | (164,−22) | (0,−132) | (0,132) | wherein, the profile line C12, the profile line C26, the profile line C63, the profile line C34, the profile line C45, and the profile line C51 between adjacent vertices are curves, and the expressions are as follows.

$C12{:}x=0.000306y^2+0.05818y-165.43;$ $C26{:}x=-0.001151y^2+1.66823y-200.14;$ $C63{:}x=-0.00247y^2+2.89978y-339.73;$ $C43{:}x=-0.000306y^2+0.05818y+165.43;$ $C54{:}x=0.001151y^2+1.66823y+200.14;$ $C15{:}x=0.00247y^2+2.89978y+339.73.$

Example (i)

In the cross-section profile of the optical unit structure, the first straight line $l_1$ is parallel to the second straight line $l_2$, and the third straight line $l_3$ is parallel to the fourth straight line $l_4$; $\theta_1=\theta_2=30°$; the fifth vertex C5 is located between the first vertex C1 and the fourth vertex C4 along the circumferential direction and a distance from the fifth vertex C5 to the first vertex C1 is the same as that from the fifth vertex C5 to the fourth vertex C4, and the sixth vertex C6 is located between the second vertex C2 and the third vertex C3 along the circumferential direction and a distance from the sixth vertex C6 to the second vertex C2 is the same as that from the sixth vertex C6 to the third vertex C3; and examples of (x,y) coordinates of the first vertex C1, the second vertex C2, the third vertex C3, the fourth vertex C4, the fifth vertex C5 and the sixth vertex C6 are shown in Table 4.

TABLE 4

| Vertex | C1 | C2 | C3 | C4 | C5 | C6 |
|---|---|---|---|---|---|---|
| Coordinate (nm) | (−164,−212) | (−164,22) | (164,212) | (164,−22) | (0,−132) | (0,102) |

The profile line C12, the profile line C26, the profile line C63, the profile line C34, the profile line C45, and the profile line C51 between adjacent vertices are curves, and the expressions are as follows.

$C12: x = 0.000306y^2 + 0.05818y - 165.43;$ $C26: x = -0.001791y^2 + 2.27212y - 213.12;$ $C63: x = 0.001491y^2 + 1.02283y - 119.84;$ $C43: x = -0.000306y^2 + 0.05818y + 165.43;$ $C54: x = 0.001151y^2 + 1.66823y + 200.14;$ $C15: x = 0.00247y^2 + 2.89978y + 339.73.$

In the profiles of examples (f), (g), and (h), the straight line extending through the first vertex and the fifth vertex and the straight line extending through the third vertex and the sixth vertex are parallel to each other, and the straight line extending through the fourth vertex and the fifth vertex and the straight line extending through the second vertex and the sixth vertex are parallel to each other.

In the profile of example (i), the straight line extending through the first vertex and the fifth vertex and the straight line extending through the second vertex and the sixth vertex are parallel to each other, and the straight line extending through the fourth vertex and the fifth vertex and the straight line extending through the third vertex and the sixth vertex are parallel to each other.

Based on the diffractive optical waveguide 200 using the cross-section profile of the optical unit structure of the above examples (a)-(i) and the same conditions of coupling light into the diffractive optical waveguide, the coupled-out efficiency and nonuniformity indices of different diffractive optical waveguides at the central position of the eyebox are calculated by simulation, as shown in Table 5.

TABLE 5

|  | Average efficiency of field of view on both sides | Average efficiency of middle field of view | Non-uniformity |
| --- | --- | --- | --- |
| Diffractive optical waveguide 2 | 8.70e-4 | 5.08e-4 | 10.09 |
| Example (a) | 5.82e-4 | 4.92e-4 | 6.31 |
| Example (b) | 7.54e-4 | 5.56e-4 | 6.98 |
| Example (c) | 7.20e-4 | 5.38e-4 | 6.07 |
| Example (d) | 6.72e-4 | 4.24e-4 | 9.51 |
| Example (e) | 7.20e-4 | 5.47e-4 | 7.27 |
| Example (f) | 7.40e-4 | 5.82e-4 | 6.97 |
| Example (g) | 7.38e-4 | 5.83e-4 | 6.82 |
| Example (h) | 6.88e-4 | 5.28e-4 | 5.88 |
| Example (i) | 6.72e-4 | 5.32e-4 | 5.80 |

For ease of comparison, the simulation results of the diffractive optical waveguide 2 in Data Example 1 are listed in Table 5.

Comparing the simulation results of Example (a) and Example (b) with the simulation results of diffractive optical waveguide 2 in Data Example 1, it can be seen that in the cross-section profile of the optical unit structure of the first grating/second grating used in the coupling-out grating of the diffractive optical waveguide according to the embodiment of the disclosure, the third straight line and the fourth straight line are not limited to the case of being parallel to each other, when the two are not parallel, it is still beneficial to improve the uniformity of the output light field of the diffractive optical waveguide.

Comparing the simulation results of examples (c), (d) and (e) with the simulation results of the diffractive optical waveguide 2 in Data Example 1, it can be seen that in the cross-section profile of the optical unit structure of the first grating/second grating used in the coupling-out grating of the diffractive optical waveguide according to the embodiment of the disclosure, the profile lines between adjacent vertices can be curves, and when the ratio of the deviation of the profile line between two vertices from the straight line extending through the two vertices to the distance between the two vertices is less than or equal to one-fifth, better coupled-out efficiency of diffractive optical waveguide and uniformity of the output light field (see Example (c) and Example (e)) can be obtained, while as the above ratio increases, the nonuniformity increases and the uniformity deteriorates (see Example (d)).

Comparing the simulation results of examples (f)-(i) with the simulation results of diffractive optical waveguide 2 in Data Example 1, it can be seen that by adding the fifth vertex and the sixth vertex and adjusting the two vertices, the coupled-out efficiency of the field of view on the two sides and in the middle as well as the uniformity can be controlled more flexibly, more control means are provided, and it is more beneficial to the design and processing of the diffractive optical waveguide. In addition, comparing Example (f) and Example (g), it can be seen that the cross-section of the optical unit structure in Example (g) has a much smooth profile due to chamfering, which is convenient for processing and restoration of the design, and at the same time, it can be seen from the simulation results that Example (g) can achieve similar or even better results than Example (f), especially in terms of uniformity.

Considering the above examples (c), (e), (g), and (i), it can be seen that the first grating in the diffractive optical waveguide according to the embodiment of the present disclosure can have a curve profile structure, its smooth edge has very good processability and can achieve high-precision restoration and mass production. At the same time, the curve profile structure has a very high degree of design freedom, which is beneficial to better control of efficiency distribution.

Although in the above examples, the profile lines between adjacent vertices in the same profile are all straight lines or curves, however, according to other embodiments of the present disclosure, these profile lines may include a straight line and a curve at the same time.

Next, diffractive optical waveguides according to other embodiments of the present disclosure will be introduced with reference to FIGS. 14 to 18, wherein gratings (such as the first grating, the second grating, etc.) with different grating structures of the coupling-out gratings in the diffractive optical waveguides have more diverse setting modes.

Figure 14:
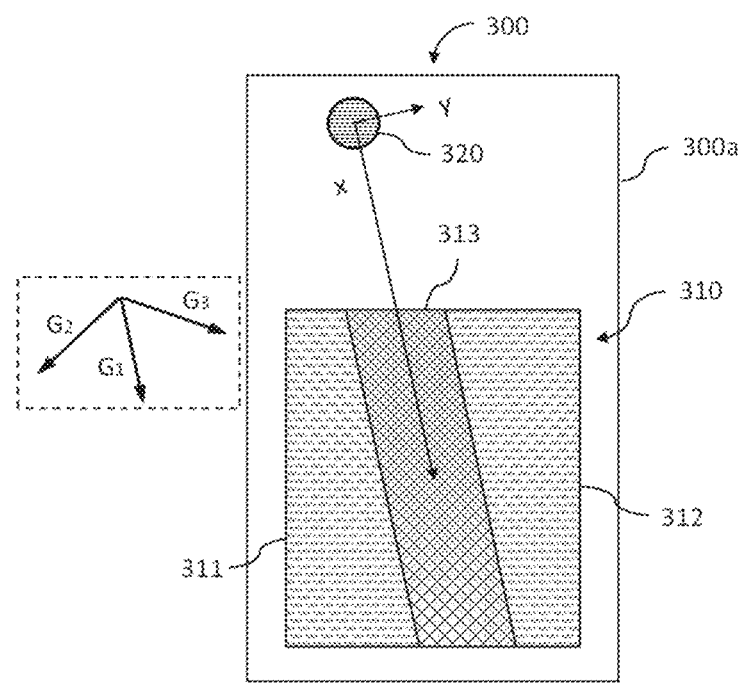
FIG. 14 is a schematic diagram of a diffractive optical waveguide according to Embodiment 3 of the present disclosure.

FIG. 14 is a schematic diagram of a diffractive optical waveguide 300 according to Embodiment 3 of the present disclosure. The diffractive optical waveguide 300 shown in FIG. 14 has basically the same structure as that of the diffractive optical waveguide 100 shown in FIG. 6, and the differences lie in that, a coupling-in grating 320 can be offset with respect to a coupling-out grating 310 in the diffractive optical waveguide 300, and the direction of the first grating vector G1 (that is, the x direction) of a first grating 311, a second grating 312 and a third grating 313 in the coupling-out grating 310 is parallel to the direction of light propagation (that is, the coupling-in direction) from the coupling-in grating 320 to the coupling-out grating 310 within the waveguide substrate 300a. In this case, as shown in FIG. 14, the first grating 311, the second grating 312, and the third grating 313 can still be considered to be arranged side by side along the y direction perpendicular to the x direction, but they can be arranged obliquely with respect to the edge of the overall shape of the coupling-out grating 310.

Figure 15:
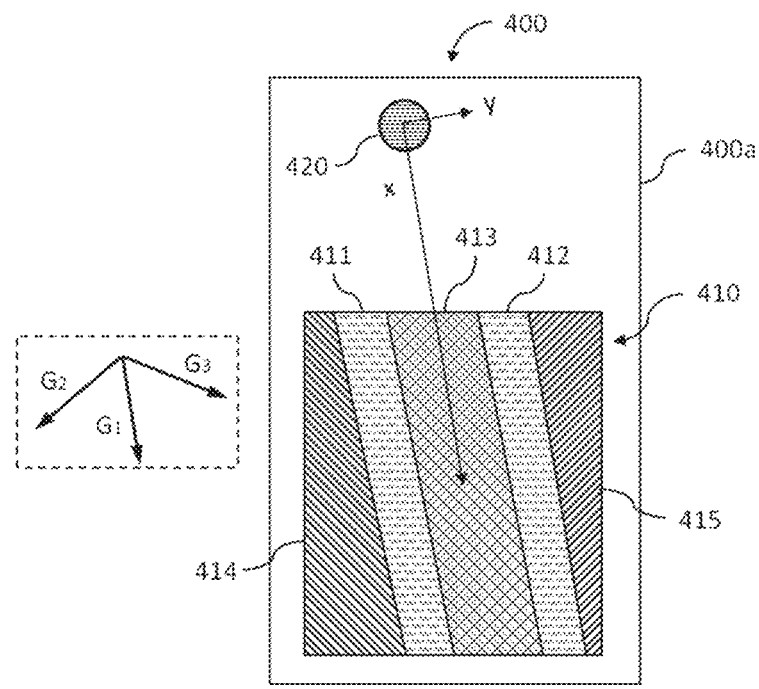
FIG. 15 is a schematic diagram of a diffractive optical waveguide according to Embodiment 4 of the present disclosure.

FIG. 15 is a schematic diagram of a diffractive optical waveguide 400 according to Embodiment 4 of the present disclosure. The diffractive optical waveguide 400 shown in FIG. 15 has basically the same structure as that of the diffractive optical waveguide 200 shown in FIG. 9, and the differences lie in that, a coupling-in grating 420 can be offset with respect to a coupling-out grating 410 in the diffractive optical waveguide 400, and the direction of the first grating vector G1 (that is, the x direction) of a first grating 411, a second grating 412 and a third grating 413 in the coupling-out grating 410 is parallel to the direction of light propagation (that is, the coupling-in direction) from the coupling-in grating 420 to the coupling-out grating 410 within the waveguide substrate 400a. Similar to that shown in FIG. 14, in this case, the first grating 411, the second grating 412, and the third grating 413 can still be considered to be arranged side by side along the y direction perpendicular to the x direction, but they can be arranged obliquely with respect to the edge of the overall shape of the coupling-out grating 410.

It should be understood that, in this application, it is considered that the light carrying image information coupled into the diffractive optical waveguide has a certain range of field of view angle, so "coupling-in direction" refers to the direction in which the central light beam within the range of the field of view angle propagates to the coupling-out grating within the waveguide substrate. Not only that but it should also be understood that, according to the embodiment of the present disclosure, the direction of the first grating vector G1 (that is, the x direction) of the coupling-out grating in the diffractive optical waveguide may not be completely consistent with the coupling-in direction, for example, there may be an angle deviation of 0-5° between the two directions.

Figure 16:
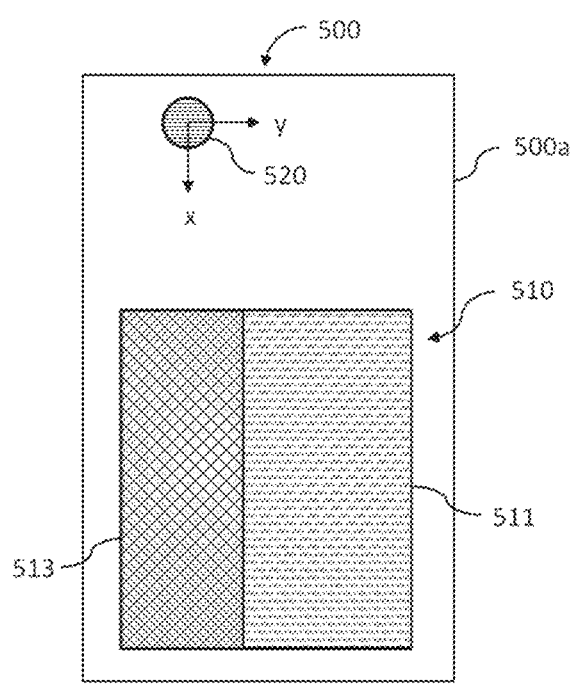
FIG. 16 is a schematic diagram of a diffractive optical waveguide according to Embodiment 5 of the present disclosure.

FIG. 16 is a schematic diagram of a diffractive optical waveguide 500 according to Embodiment 5 of the present disclosure. As shown in FIG. 16, a coupling-in grating 520 can be offset with respect to a coupling-out grating 510 in the diffractive optical waveguide 500, and the coupling-out grating 510 only includes a first grating 511 and a third grating 513, without including the second grating introduced in the above embodiments. In this way, the third grating 513 in the coupling-out grating 510 can be arranged opposite to the coupling-in grating 520.

Figure 17:
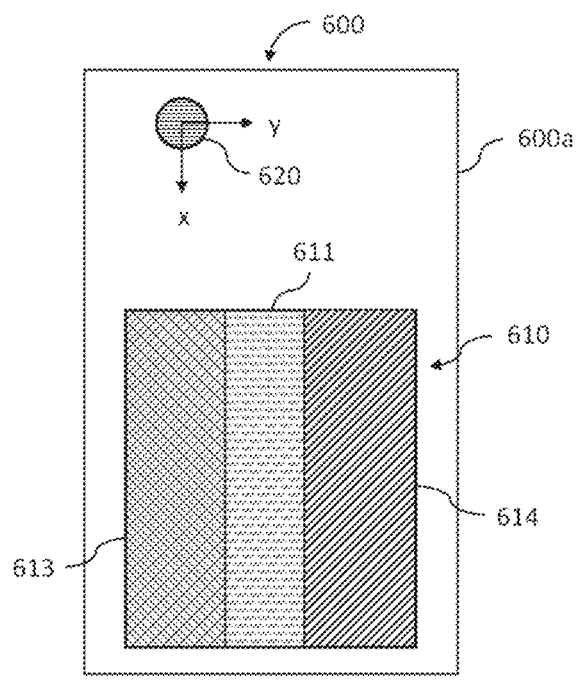
FIG. 17 is a schematic diagram of a diffractive optical waveguide according to Embodiment 6 of the present disclosure.

FIG. 17 is a schematic diagram of a diffractive optical waveguide 600 according to Embodiment 6 of the present disclosure. As shown in FIG. 17, a coupling-in grating 620 can be offset with respect to a coupling-out grating 610 in the diffractive optical waveguide 600, and the coupling-out grating 610 only includes a first grating 611, a third grating 613, and a fourth grating 614 located on the opposite side of the third grating 613 relative to the first grating 611, without including a second grating and a fifth grating. The fourth grating is a one-dimensional grating and its grating vector is oriented away from the first grating 611. In this way, the third grating 613 in the coupling-out grating 610 can be arranged opposite to the coupling-in grating 620.

The embodiments shown in FIGS. 14 to 17 provide more layout schemes of diffractive optical waveguides for the case where the coupling-in grating is offset with respect to the coupling-out grating.

Figure 18:
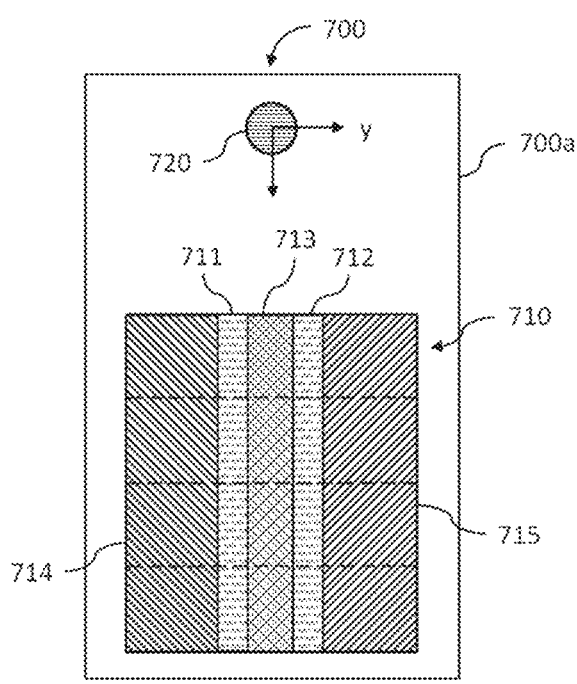
FIG. 18 is a schematic diagram of a diffractive optical waveguide according to Embodiment 7 of the present disclosure.

FIG. 18 is a schematic diagram of a diffractive optical waveguide 700 according to Embodiment 7 of the present disclosure. The diffractive optical waveguide 700 may have substantially the same structure as that of the diffractive optical waveguide 200 shown in FIG. 9, and the differences lie in that, each sub-grating of coupling-out grating 710 (including a first grating 711, a second grating 712, a third grating 713, a fourth grating 714, and a fifth grating 715) is divided into more than two subareas, and each sub-grating may have different optical unit structures in its subareas. For example, the first grating 711 may have optical unit structures with different cross-section profiles as shown in FIGS. 10-13 in its subareas, thus providing a very flexible means for regulating the coupled-out efficiency of diffractive optical waveguide 700 in different regions and different field of view regions and regulating the uniformity of the output light field. This is beneficial to the design and manufacture of diffractive optical waveguides.

The diffractive optical waveguide according to the embodiment of the present disclosure can be applied in a display apparatus. Such a display apparatus is, for example, a near-eye display apparatus, which includes a lens and a frame for holding the lens close to the eye, the lens including a diffractive optical waveguide according to an embodiment of the present disclosure as described above. Preferably, the display apparatus may be an augmented reality display apparatus or a virtual reality display apparatus.

As discussed above with reference to the illustration of the figures, the followings are provided in this application:
(1) A diffractive optical waveguide, comprising a waveguide substrate and a coupling-out grating formed on the waveguide substrate, wherein,
the coupling-out grating is configured to couple at least a portion of light within the waveguide substrate propagating thereinto through total internal reflection substantially along a coupling-in direction out of the waveguide substrate by diffraction, the coupling-out grating comprises a first grating, and the first grating comprises a plurality of first optical unit structures arranged in an array along a plane and has a first grating vector, a second grating vector, and a third grating vector, wherein a direction of the first grating vector is a first direction, and the first direction is substantially consistent with the coupling-in direction, and directions of the second grating vector and the third grating vector, being respectively towards both sides of the first direction, form acute angles with the first direction, wherein,
the first optical unit structure has a first predetermined profile when viewed in the plane, and the first predetermined profile has a first vertex, a second vertex, a third vertex, and a fourth vertex arranged in sequence along the circumferential direction, wherein the first vertex and the second vertex are located at one end of the first predetermined profile in the first direction, the third vertex and the fourth vertex are located at the other end of the first predetermined profile in the first direction, and the first vertex and the third vertex are outermost vertices of the first predetermined profile in a second direction perpendicular to the first direction; and
a first straight line extending through the first vertex and the second vertex and a second straight line extending through the third vertex and the fourth vertex are substantially perpendicular to the first direction, and a third straight line extending through the first vertex and the fourth vertex forms a first angle $\theta_1$ with the first direction, a fourth straight line extending through the second vertex and the third vertex forms a second angle $\theta_2$ with the first direction, where $15° \leq |\theta_1| \leq 45°$,

23

$15° \leq |\theta_2| \leq 45°$, and the first angle $\theta_1$ and the second angle $\theta_2$ have a same positive sign or a same negative sign.
(2) The diffractive optical waveguide of item (1), wherein the third straight line and the fourth straight line are substantially perpendicular to the second grating vector or the third grating vector.
(3) The diffractive optical waveguide of item (1) or (2), wherein a part of the first predetermined profile between any two vertices adjacent to each other of the first vertex, the second vertex, the third vertex, and the fourth vertex deviates from a straight line extending through the two vertices by a distance less than or equal to one-fifth of a distance between the two vertices.
(4) The diffractive optical waveguide of item (1) or (2), wherein the third straight line and the fourth straight line are parallel to each other.
(5) The diffractive optical waveguide of item (1) or (2), wherein the first predetermined profile has an overall length L in the first direction and an average width W in the second direction, where $0.1 L \leq W \leq L$.
(6) The diffractive optical waveguide of claim item (1) or (2), wherein the first predetermined profile is a quadrilateral.
(7) The diffractive optical waveguide of item (1) or (2), wherein a profile line, connecting at least one pair of adjacent vertices among the first vertex, the second vertex, the third vertex, and the fourth vertex along the circumferential direction, is a curve.
(8) The diffractive optical waveguide of item (7), wherein a profile line connecting the first vertex and the second vertex and a profile line connecting the third and the fourth vertex are curves, and/or a profile line connecting the first vertex and the fourth vertex and a profile line connecting the second vertex and the third vertex are curves.
(9) The diffractive optical waveguide of item (1) or (2), wherein the first predetermined profile further has a fifth vertex and a sixth vertex, the fifth vertex is located between the first vertex and the fourth vertex along the circumferential direction, and the sixth vertex is located between the second vertex and the third vertex along the circumferential direction.
(10) The diffractive optical waveguide of item (9), wherein a distance from the fifth vertex to the first vertex is substantially equal to that from the fifth vertex to the fourth vertex; and a distance from the sixth vertex to the second vertex is substantially equal to that from the sixth vertex to the third vertex.
(11) The diffractive optical waveguide of item (9), wherein a straight line extending through the first vertex and the fifth vertex and a straight line extending through the third vertex and the sixth vertex are parallel to each other, and a straight line extending through the fourth vertex and the fifth vertex and a straight line extending through the second vertex and the sixth vertex are parallel to each other; or the straight line extending through the first vertex and the fifth vertex and the straight line extending through the second vertex and the sixth vertex are parallel to each other, and the straight line extending through the fourth vertex and the fifth vertex and the straight line extending through the third vertex and the sixth vertex parallel to each other.
(12) The diffractive optical waveguide of item (9), wherein a profile line, between at least one pair of adjacent vertices connected circumferentially among the first vertex, the second vertex, the third vertex, the fourth vertex, the fifth vertex, and the sixth vertex, is a curve.
(13) The diffractive optical waveguide of item (12), wherein profile lines, between adjacent vertices connected circumferentially among the first vertex, the second vertex, the third vertex, the fourth vertex, the fifth vertex, and the sixth vertex, are curves.
(14) The diffractive optical waveguide of item (1) or (2), wherein the plurality of the first optical unit structures are arranged to form a plurality of rows extending along the second direction, and the plurality of rows are arranged with a predetermined pitch in the first direction, the first optical unit structures are arranged with a period P in the row, and the first optical unit structures in two adjacent rows among the plurality of rows are staggered by a predetermined distance s in the second direction, wherein, $s = P/n$ and $1.33 \leq n \leq 4$.
(15) The diffractive optical waveguide of item (14), wherein $n=2$.
(16) The diffractive optical waveguide of item (1), wherein the coupling-out grating further comprises a second grating, and the second grating comprises a plurality of second optical unit structures arranged in an array along the plane and has the first grating vector, the second grating vector, and the third grating vector;
the second optical unit structure has a second predetermined profile when viewed in the plane, and the second predetermined profile has a seventh vertex, an eighth vertex, a ninth vertex and a tenth vertex, arranged in sequence along the circumferential direction, wherein the seventh vertex and the eighth vertex are located at one end of the second predetermined profile in the first direction, the ninth vertex and the tenth vertex are located at the other end of the second predetermined profile in the first direction, the seventh vertex and the ninth vertex are outermost vertices of the second predetermined profile in the second direction;
a fifth straight line extending through the seventh vertex and the eighth vertex and a sixth straight line extending through the ninth vertex and the tenth vertex are substantially perpendicular to the first direction, and a seventh straight line extending through the seventh vertex and the tenth vertex forms a third angle $\theta_3$ with the first direction, an eighth straight line extending through the eighth vertex and the ninth vertex forms a fourth angle $\theta_4$ with the first direction, where $15° \leq |\theta_3| \leq 45°$, $15° \leq |\theta_4| \leq 45°$, and the third angle $\theta_3$ and the included angle $\theta_4$ have the same positive sign or the same negative sign; and
the first grating and the second grating are arranged side by side in the second direction, so that the third straight line and the fourth straight line in the first predetermined profile of the first grating tilt towards the second grating along the first direction, and the seventh straight line and the eighth straight line in the second predetermined profile of the second grating tilt towards the first grating along the first direction.
(17) The diffractive optical waveguide of item (16), wherein the coupling-out grating further comprises a third grating, the third grating comprises a plurality of third optical unit structures arranged in an array along the plane and has the first grating vector, the second grating vector, and the third grating vector; the third optical unit structure has a third predetermined profile symmetrical with respect to an axis along the first direction when viewed in the plane; and the third grating is arranged between the first grating and the second grating along the second direction.

(18) The diffractive optical waveguide of item (16) or (17), wherein, the coupling-out grating further comprises a fourth grating and a fifth grating, arranged side by side with the first grating and the second grating in the second direction and respectively located outside the first grating and the second grating; and the fourth grating is a one-dimensional grating and has a fourth grating vector, the fifth grating is a one-dimensional grating and has a fifth grating vector, the fourth grating vector and the fifth grating vector are respectively the same as the second grating vector and the third grating vector, the fourth grating vector faces a direction away from the fifth grating, and the fifth grating vector faces a direction away from the fourth grating.

(19) The diffractive optical waveguide of item (1), wherein the coupling-out grating further comprises a third grating, the third grating comprising a plurality of third optical unit structures arranged in an array along the plane and has the first grating vector, the second grating vector, and the third grating vector; the third optical unit structure has a third predetermined profile symmetrical with respect to an axis along the first direction when viewed in the plane; and the first grating and the third grating are arranged side by side in the second direction so that the third straight line and the fourth straight line in the first predetermined profile of the first grating tilt towards the third grating along the first direction.

(20) A display apparatus, comprising the diffractive optical waveguide of any one of items (1)-(19).

(21) The display apparatus of item (20), wherein the display apparatus is a near-eye display apparatus and comprises a lens and a frame for holding the lens close to the eye, the lens comprising the diffractive optical waveguide.

(22) The display apparatus of items (20) or (21), wherein the display apparatus is an augmented reality display apparatus or a virtual reality display apparatus.

The above description is merely an illustration of the preferred embodiments of the present application and the applied technical principles. Those skilled in the art should understand that the scope of the disclosure involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. A diffractive optical waveguide, comprising a waveguide substrate and a coupling-out grating formed on the waveguide substrate, wherein,
    the coupling-out grating is configured to couple at least a portion of light within the waveguide substrate propagating thereinto through total internal reflection substantially along a coupling-in direction out of the waveguide substrate by diffraction, the coupling-out grating comprises a first grating, and the first grating comprises a plurality of first optical unit structures arranged in an array along a plane and has a first grating vector, a second grating vector, and a third grating vector, wherein a direction of the first grating vector is a first direction, and the first direction is substantially consistent with the coupling-in direction, and directions of the second grating vector and the third grating vector, being respectively towards both sides of the first direction, form acute angles with the first direction, wherein
    the first optical unit structure has a first predetermined profile when viewed in the plane, and the first predetermined profile has a first vertex, a second vertex, a third vertex and a fourth vertex, arranged in sequence along the circumferential direction, wherein the first vertex and the second vertex are located at one end of the first predetermined profile in the first direction, the third vertex and the fourth vertex are located at the other end of the first predetermined profile in the first direction, and the first vertex and the third vertex are outermost vertices of the first predetermined profile in a second direction perpendicular to the first direction; and
    a first straight line extending through the first vertex and the second vertex and a second straight line extending through the third vertex and the fourth vertex are substantially perpendicular to the first direction, and a third straight line extending through the first vertex and the fourth vertex forms a first angle $\theta_1$ with the first direction, a fourth straight line extending through the second vertex and the third vertex forms a second angle $\theta_2$ with the first direction, where $15° \leq |\theta_1| \leq 45°$, $15° \leq |\theta_2| \leq 45°$, and the first angle $\theta_1$ and the second angle $\theta_2$ have a same positive sign or a same negative sign.

2. The diffractive optical waveguide of claim 1, wherein the third straight line and the fourth straight line are substantially perpendicular to the second grating vector or the third grating vector.

3. The diffractive optical waveguide of claim 1, wherein a part of the first predetermined profile between any two vertices adjacent to each other of the first vertex, the second vertex, the third vertex, and the fourth vertex deviates from a straight line extending through the two vertices by a distance less than or equal to one-fifth of a distance between the two vertices.

4. The diffractive optical waveguide of claim 1, wherein the third straight line and the fourth straight line are parallel to each other.

5. The diffractive optical waveguide of claim 1, wherein the first predetermined profile has an overall length L in the first direction and an average width W in the second direction, where $0.1 L \leq W \leq L$.

6. The diffractive optical waveguide of claim 1, wherein the first predetermined profile is a quadrilateral.

7. The diffractive optical waveguide of claim 1, wherein a profile line, connecting at least one pair of adjacent vertices among the first vertex, the second vertex, the third vertex, and the fourth vertex along the circumferential direction, is a curve.

8. The diffractive optical waveguide of claim 7, wherein a profile line connecting the first vertex and the second vertex and a profile line connecting the third and the fourth vertex are curves, and/or a profile line connecting the first vertex and the fourth vertex and a profile line connecting the second vertex and the third vertex are curves.

9. The diffractive optical waveguide of claim 1, wherein the first predetermined profile further has a fifth vertex and a sixth vertex, the fifth vertex is located between the first vertex and the fourth vertex along the circumferential direction, and the sixth vertex is located between the second vertex and the third vertex along the circumferential direction.

10. The diffractive optical waveguide of claim 9, wherein a distance from the fifth vertex to the first vertex is substantially equal to that from the fifth vertex to the fourth vertex; and a distance from the sixth vertex to the second vertex is substantially equal to that from the sixth vertex to the third vertex.

11. The diffractive optical waveguide of claim 9, wherein a straight line extending through the first vertex and the fifth vertex and a straight line extending through the third vertex and the sixth vertex are parallel to each other, and a straight line extending through the fourth vertex and the fifth vertex and a straight line extending through the second vertex and the sixth vertex are parallel to each other; or
the straight line extending through the first vertex and the fifth vertex and the straight line extending through the second vertex and the sixth vertex are parallel to each other, and the straight line extending through the fourth vertex and the fifth vertex and the straight line extending through the third vertex and the sixth vertex parallel to each other.

12. The diffractive optical waveguide of claim 9, wherein a profile line, between at least one pair of adjacent vertices connected circumferentially among the first vertex, the second vertex, the third vertex, the fourth vertex, the fifth vertex, and the sixth vertex, is a curve.

13. The diffractive optical waveguide of claim 12, wherein profile lines, between adjacent vertices connected circumferentially among the first vertex, the second vertex, the third vertex, the fourth vertex, the fifth vertex, and the sixth vertex, are curves.

14. The diffractive optical waveguide of claim 1, wherein the plurality of the first optical unit structures are arranged to form a plurality of rows extending along the second direction, and the plurality of rows are arranged with a predetermined pitch in the first direction, the first optical unit structures are arranged with a period P in the row, and the first optical unit structures in two adjacent rows among the plurality of rows are staggered by a predetermined distance s in the second direction, wherein, s=P/n and 1.33≤n≤4.

15. The diffractive optical waveguide of claim 14, wherein n=2.

16. The diffractive optical waveguide of claim 1, wherein the coupling-out grating further comprises a second grating, and the second grating comprises a plurality of second optical unit structures arranged in an array along the plane and has the first grating vector, the second grating vector, and the third grating vector;
the second optical unit structure has a second predetermined profile when viewed in the plane, and the second predetermined profile has a seventh vertex, an eighth vertex, a ninth vertex and a tenth vertex, arranged in sequence along the circumferential direction, wherein the seventh vertex and the eighth vertex are located at one end of the second predetermined profile in the first direction, the ninth vertex and the tenth vertex are located at the other end of the second predetermined profile in the first direction, the seventh vertex and the ninth vertex are outermost vertices of the second predetermined profile in the second direction;

a fifth straight line extending through the seventh vertex and the eighth vertex and a sixth straight line extending through the ninth vertex and the tenth vertex are substantially perpendicular to the first direction, and a seventh straight line extending through the seventh vertex and the tenth vertex forms a third angle $\theta_3$ with the first direction, an eighth straight line extending through the eighth vertex and the ninth vertex forms a fourth angle $\theta_4$ with the first direction, where $15°≤|\theta_3|≤45°$, $15°≤|\theta_4|≤45°$, and the third angle $\theta_3$ and the included angle $\theta_4$ have the same positive sign or the same negative sign; and
the first grating and the second grating are arranged side by side in the second direction, so that the third straight line and the fourth straight line in the first predetermined profile of the first grating tilt towards the second grating along the first direction, and the seventh straight line and the eighth straight line in the second predetermined profile of the second grating tilt towards the first grating along the first direction.

17. The diffractive optical waveguide of claim 16, wherein the coupling-out grating further comprises a third grating, the third grating comprises a plurality of third optical unit structures arranged in an array along the plane and has the first grating vector, the second grating vector, and the third grating vector;
the third optical unit structure has a third predetermined profile symmetrical with respect to an axis along the first direction when viewed in the plane; and
the third grating is arranged between the first grating and the second grating along the second direction.

18. The diffractive optical waveguide of claim 16, wherein, the coupling-out grating further comprises a fourth grating and a fifth grating, arranged side by side with the first grating and the second grating in the second direction and respectively located outside the first grating and the second grating; and
the fourth grating is a one-dimensional grating and has a fourth grating vector, the fifth grating is a one-dimensional grating and has a fifth grating vector, the fourth grating vector and the fifth grating vector are respectively the same as the second grating vector and the third grating vector, the fourth grating vector faces a direction away from the fifth grating, and the fifth grating vector faces a direction away from the fourth grating.

19. The diffractive optical waveguide of claim 1, wherein the coupling-out grating further comprises a third grating, the third grating comprising a plurality of third optical unit structures arranged in an array along the plane and has the first grating vector, the second grating vector, and the third grating vector;
the third optical unit structure has a third predetermined profile symmetrical with respect to an axis along the first direction when viewed in the plane; and
the first grating and the third grating are arranged side by side in the second direction so that the third straight line and the fourth straight line in the first predetermined profile of the first grating tilt towards the third grating along the first direction.

20. A display apparatus, comprising the diffractive optical waveguide of claim 1.

* * * * *